United States Patent
Scofield et al.

(10) Patent No.: US 8,073,460 B1
(45) Date of Patent: Dec. 6, 2011

(54) SYSTEM AND METHOD FOR PROVIDING ADVERTISEMENT BASED ON MOBILE DEVICE TRAVEL PATTERNS

(75) Inventors: Christopher L. Scofield, Seattle, WA (US); Elmore Eugene Pope, Sammamish, WA (US); Brad E. Marshall, Bainbridge Island, WA (US); Eric B. Merritt, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 709 days.

(21) Appl. No.: 11/693,363

(22) Filed: Mar. 29, 2007

Related U.S. Application Data

(63) Continuation-in-part of application No. 11/683,849, filed on Mar. 8, 2007.

(51) Int. Cl.
*H04W 24/00* (2009.01)
*G06Q 30/00* (2006.01)
*H04M 3/42* (2006.01)

(52) U.S. Cl. ............... 455/456.1; 455/414.1; 455/456.3; 705/14.71

(58) Field of Classification Search ............... 455/414.1, 455/414.2, 456.1; 705/14
See application file for complete search history.

(56) References Cited

U.S. PATENT DOCUMENTS

| | | | |
|---|---|---|---|
| 6,144,336 A | 11/2000 | Preston et al. | |
| 6,343,317 B1 | 1/2002 | Glorikian | |
| 6,801,855 B1 | 10/2002 | Cuchlinski, Jr. | |
| 6,765,492 B2 | 7/2004 | Harris | |
| 6,801,778 B2 | 10/2004 | Koorapaty | |
| 6,806,830 B2 | 10/2004 | Panasik | |
| 6,903,685 B1 | 6/2005 | Arndt | |
| 2002/0002504 A1* | 1/2002 | Engel et al. | 705/26 |
| 2002/0050927 A1* | 5/2002 | De Moerloose et al. | 340/539 |
| 2002/0077130 A1* | 6/2002 | Owensby | 455/466 |
| 2002/0094787 A1 | 7/2002 | Avnet et al. | |
| 2002/0111154 A1 | 8/2002 | Eldering et al. | |
| 2002/0183059 A1 | 12/2002 | Noreen et al. | |
| 2003/0126150 A1 | 7/2003 | Chan | |
| 2003/0200128 A1* | 10/2003 | Doherty | 705/8 |
| 2004/0044574 A1* | 3/2004 | Cochran et al. | 705/14 |
| 2004/0127217 A1 | 7/2004 | Aoki et al. | |

(Continued)

OTHER PUBLICATIONS

U.S. Appl. No. 11/683,849, filed Mar. 8, 2007.

(Continued)

*Primary Examiner* — Nick Corsaro
*Assistant Examiner* — Edd Rianne Plata
(74) *Attorney, Agent, or Firm* — Robert C. Kowert; Meyertons, Hood, Kivlin, Kowert & Goetzel, P.C.

(57) ABSTRACT

Mobile device users may be tracked either via mobile-signal triangulation or via Global Positioning Satellite information. A mobile device user's recent movements may be analyzed to determine trails or traffic patterns for device user among various locations. Mobile device trail information, either for an individual user or aggregated for multiple users, may be analyzed to determine a next destination for the user. Electronic advertising content, such as advertisements, coupons and/or other communications, associated with the next destination may be sent to an electronic device likely to be viewed by the mobile device user. Additionally, the identity of the mobile device user may be known and the advertisements or coupons may be tailored according to demographic information regarding the mobile device user. In addition, destinations may be recommended to mobile device users based on the recent locations the users have visited.

36 Claims, 9 Drawing Sheets

U.S. PATENT DOCUMENTS

| | | |
|---|---|---|
| 2005/0049789 A1 | 3/2005 | Kelly et al. |
| 2005/0064851 A1* | 3/2005 | Malackowski et al. .... 455/414.1 |
| 2006/0036366 A1 | 2/2006 | Kelly et al. |
| 2006/0040710 A1 | 2/2006 | Ruetschi et al. |
| 2006/0053048 A1 | 3/2006 | Tandetnik |
| 2006/0064346 A1* | 3/2006 | Steenstra et al. ................ 705/14 |
| 2006/0265281 A1 | 11/2006 | Sprovieri et al. |
| 2007/0010942 A1* | 1/2007 | Bill .............................. 701/209 |
| 2007/0105536 A1 | 5/2007 | Tingo |
| 2007/0270132 A1* | 11/2007 | Poosala ...................... 455/414.2 |
| 2008/0046324 A1* | 2/2008 | Bailey et al. .................... 705/14 |
| 2008/0228568 A1* | 9/2008 | Williams et al. ................ 705/14 |

OTHER PUBLICATIONS

Office Action from U.S. Appl. No. 11/683,849, mailed Oct. 7, 2009.

* cited by examiner

SYSTEM AND METHOD FOR PROVIDING ADVERTISEMENT BASED ON MOBILE DEVICE TRAVEL PATTERNS

This application is a Continuation-In-Part of U.S. patent application Ser. No. 11/683,849 titled, "System and Method for Analyzing Mobile Device Travel Patterns," filed Mar. 8, 2007, whose inventors are Christopher L. Scofield, Elmore Eugene Pope, Brad E. Marshall and Eric B. Merritt, which is herein incorporated by reference in its entirety.

BACKGROUND OF THE INVENTION

1. Field of the Invention

This invention relates to mobile device user traffic patterns and, more particularly, to directing advertising to mobile device users corresponding to predicted future destinations of the mobile device users.

2. Description of the Related Art

Mobile phones have gone from being rare and expensive pieces of equipment used primarily by the business elite, to a pervasive low-cost personal item. In many countries, mobile phones now outnumber land-line telephones, with most adults and many children now owning mobile phones. In the United States, 50% of children own mobile phones. It is not uncommon for people to simply own a mobile phone instead of a land-line for their residence. In some developing countries there is little existing fixed-line infrastructure and consequently mobile phone use has become widespread. In general, a mobile or cellular telephone is a long-range, portable electronic device for personal telecommunications over long (or short) distances. Most current mobile phones connect to a cellular network of base stations (cell sites), which is in turn interconnected to the public switched telephone network (PSTN) (the exception are satellite phones).

With high levels of mobile telephone penetration, a mobile culture has evolved, where the phone becomes a key social tool, and people rely on their mobile phone address book to keep in touch with their friends. Many phones offer text-messaging services to increase the simplicity and ease of texting on phones. Many people keep in touch using text messaging, such as SMS, and a whole culture of "texting" has developed from this.

Traditionally, commercial advertising has been concerned with attempting to get the most consumers as possible to see the particular advertisement. Various media have been used for advertising over the years, such as, billboards, printed flyers, radio, cinema and television ads, web banners, web popups, magazines, newspapers, and even the sides of buses, taxicab doors and roof mounts. Advertisers generally must select a static location at which to place their advertisement and hope that consumers happen upon them.

Recently modern mobile phones or other mobile devices may be located either by cell-signal triangulation or through Global Positioning Satellite (GPS) tracking. In general, mobile device service providers are increasingly required to provide positioning information to support emergency services. When using cell-signal triangulation, mobile device users can be tracked at all times regardless of whether a cell call is underway. This is because the mobile device performs a periodic connectivity check to the service provider. This check registers the device relative to cell towers.

SUMMARY

The movements of mobile device users may be detected, recorded, tracked and analyzed in order to direct advertising content to the mobile device users based on the users' predicted destinations. For example, location dependent advertising content may be provided to mobile device users based on a current and/or predicted location that the mobile device user is likely to visit. In some embodiments, mobile device users' current and past travel patterns may be analyzed to determine a predicted next destination. For instance, by analyzing the recent movements of a mobile device user among stores in a shopping mall, it may be determined that a particular store is a predicted next destination for the mobile device user. Thus, advertising content for the predicted destination, such as coupons, may be sent to the mobile device user.

In some embodiments, a mobile device user's travel or traffic patterns (e.g., a set of locations and the order in which those location are visited) may be analyzed to predict a next likely location or destination. Various types of advertising content, such as electronic coupons, and other advertisements may be directed to the mobile device user based on the predicted destination. For example, a mobile device user may be tracked as she shops at various stores in a shopping mall. Based on the stores she has recently visited, a traffic pattern analysis system may determine a next most likely store or other destination that the mobile device user may visit. The system may then send advertisements, coupons, or other commercial communication to the user's mobile device or to another electronic display device, such as to offer a discount or other shopping benefit to the mobile device user if she visits the predicted destination.

For instance, in one embodiment, a mobile device user may be tracked as she visits several of the clothing stores in a shopping mall. Based on the type and location of the stores visited, the system may determine that she is likely to visit another clothing store in another part of the shopping mall. In response to determining a store that the mobile device user is likely to visit, the system may send advertising content, such as an electronic coupon good for 10% off any purchases made at the store that day, to the mobile device user. Thus, the mobile device user may be more likely to visit the store because of the added enticement of the discount.

Mobile device directed advertising content may be used in situations other than retail shopping. For example, a mobile device user may be tracked while attending a large entertainment venue or sporting event and coupons advertising a discount at a restaurant that the mobile device user is likely to visit based on the user's traffic or travel patterns at the entertainment venue or sporting event. Similarly, mobile device users attending a large venue may be tracked and provided coupons for vendors the mobile device users are likely to pass based on their recent travel patterns in and around the venue.

In some embodiments, the advertising content, such as coupons, discount offers, and other advertisements, may be sent to the mobile device of the user. For example, advertising content may be directed to the user's mobile phone. In other embodiments, however, the advertising content may be sent and displayed on a separate electronic display device, such as a kiosk in a shopping mall that includes an electronic display device. For example, an advertisement for a particular store determined to be a likely destination for a mobile user may be displayed on a wall mounted electronic display device in the mall along a path the user is likely to take to the predicted destination.

In some embodiments, the service may allow the destinations (store owners) to pay or bid to have advertising for their location communicated to the mobile device. For example, the system may determine more than one predicted destination and may allow each of the predicted destinations to bid on placing advertising on the mobile device. In some embodiments, such bidding may occur in real time, such as by automated bidding software. In other embodiments, the cost of the advertising may be determined based on the likelihood that the mobile device user may travel to the particular destination. In other words, if previous traffic pattern analysis determines that the mobile device user is highly likely to go to a particular destination, such as a particular store in a shopping mall, the cost of placing an advertisement for that particular destination on the mobile device may be more expensive than if there is a low probability of the mobile device user going to the particular destination.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As noted above, the movements of mobile device users may be detected, recorded, tracked and analyzed in order to direct advertising content to the mobile device users based on the users' predicted destinations. In some embodiments, mobile device users' current and past traffic patterns may be analyzed to determine a predicted next destination. For instance, by analyzing the recent movements of a mobile device user among stores in a shopping mall, it may be determined that a particular store is a predicted next destination for the mobile device user. Thus, advertising content for the predicted destination, such as coupons, may be sent, displayed, or otherwise provided to the mobile device user.

As used herein the term 'destination' is not intended to necessarily convey any sort of finality. Instead, 'destination' is used merely to indicate a location to which a mobile device user may travel. The mobile device user may also travel to additional locations or destinations. Thus, as used herein, a 'destination' is simply a location, that may or may not be a final or intermediate location visited by a mobile device user. Additionally, as used herein the terms 'predicted destination', 'predicted next destination' and the like, are used to refer to a location to which a mobile device user is more likely to visit than another location and is not meant to necessarily imply any absolute probability of the mobile device user visiting the location.

Figure 1:
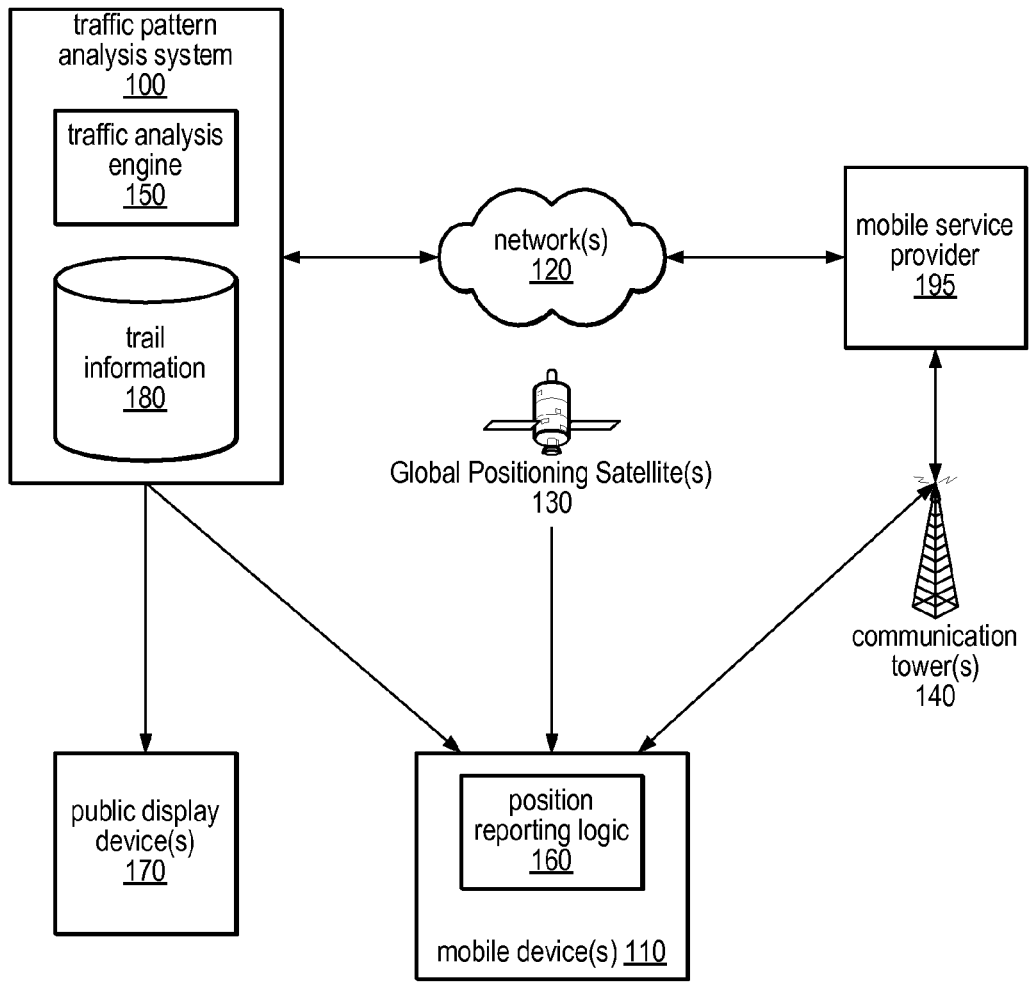
FIG. 1 is a logical block diagram illustrating various components of a system configured to analyze mobile device users' traffic patterns and to determine next destinations for the mobile device users to communicate advertising content regarding the next destination to the mobile device user, according to one embodiment.

FIG. 1 is a logical block diagram illustrating various components of a system including traffic pattern analysis system 100 (herein also referred to only as system 100) that, in some embodiments, may be configured to analyze traffic patterns (also referred to herein as trail or path information) for mobile device users in order to determine predicted destinations for the mobile device users and to communicate advertising, coupons and/or other information regarding the predicted destination to the mobile device user.

A mobile device user's predicted destination may be determined based on the user's recent traffic pattern, current location, and in some embodiments, demographic information regarding the cell device user. Thus, the system may be configured to determine a predicted destination out of several potential destinations along the mobile device user's projected traffic path or trail. Additionally, a history of traffic patterns of both the current mobile device user and other mobile device users may be used, at least in part, to determine a predicted destination for the mobile device user.

Navigational path or traffic pattern information regarding mobile device user navigation between and among physical locations, such as among various stores in a shopping mall, may be analyzed to determine user trails or navigational paths between and among the locations. Such user trails may be used to aid in various types of advertising decisions, such as directing electronic advertising or coupons for a predicted next destination of the mobile device user, or to recommend one or more destinations to the user, according to various embodiments. Mobile device users' traffic patterns, such as the order in which users navigate among stores in a shopping mall, venders in a flea market or rides in an amusement park, may be collected and may be aggregated over time.

For example, in some embodiments, system 100 may determine one or more other locations from which users travel to a particular location. For instance, a location L1 may be frequently visited from location L2. Thus, a user trail may be considered to exist from location L2 to L1. Advertisers and other entities may utilize information regarding such traffic patterns, or user trails, when making decisions regarding advertising. For example, analysis of traffic patterns may determine that a large number of mobile device users visit location L2 prior to visiting location L1. Thus, advertising for location L1 (such as sending an electronic coupon for location L1 to a mobile device or other display device) while mobile device users are at or leaving location L2 may increase the visibility of location L1 and/or allow for targeted advertising, such as for a certain product offered at location L1. For example, by analyzing the recent traffic pattern of a mobile device user as she moves through a shopping mall, system 100 may determine that the mobile device user has visited three of the four major clothing retailers in the mall and thus may determine that she will likely visit the other clothing retailer next. Thus, in one embodiment, system 100 may send her an advertisement or coupon for the other clothing retailer or for a specific item at the other clothing retailer. Alternatively, in another embodiment, system 100 may recommend that the mobile device visit the other clothing retailer. For instance, the mobile device user may request a recommendation of a store to visit and system 100 may then recommend the other clothing retailer.

In another example, analysis of mobile device path and/or trail information may determine that a high number of mobile device users that visit a particular luxury restaurant also visit other locations related to luxury items, such as a winery nearby the restaurant. Thus, the winery may desire to send coupons or advertisements for the winery to mobile device users that are currently at (or leaving) the restaurant. In yet another example embodiment, a mobile device user may be visiting various tourist sites in and around a particular city and system 100 may recommend additional tourist sites to the mobile device user. As will be described in more detail subsequently, system 100 may analyze the mobile device user's previous movements, such as the locations recently visited and the order in which those locations were visited to determine one or more destinations to suggest or recommend to the user.

While described herein mainly by use of the terms "site", "location", or "destination", navigational pattern information, paths, and user trails for mobile device users may refer to virtually any granularity of positioning information. For instance, the term "location" as used herein may, in various embodiments, refer to a particular GPS position based on latitude and longitude, a particular shopping mall, sports arena, a city's business district, a individual vendor or shop in a shopping, sporting or entertainment venue, individual aisles or sections of a store, or even individual rooms in conference facility. Additionally, a mobile device user's movements, both current and past movements may be referred to herein as the user's "path", "traffic" or "travel" pattern and may be analyzed to determine trails or paths among the locations visited. Varying levels or granularity of traffic pattern information, navigational paths, and user trails may also be collected, analyzed, and utilized as part of determining predicted destinations and/or advertising decisions, as described herein. For example, in one embodiment, a navigational path or user trail may indicate how a mobile device user (or users) visited various shopping, sports, entertainment, or business locations.

In addition, the frequency at which positional information is provided to, or obtained by, system 100 may vary from embodiment to embodiment. For instance, in some embodiments, system 100 may receive positional information regarding a mobile device once a second, while in other embodiments, system 100 may receive the positional information less frequently, such as once every minute or once every five minutes. Furthermore, regardless of the frequency at which positional information is available, system 100 may filter out some positional information, such as redundant positional reports regarding a non-moving mobile device, for example. In some embodiments, system 100 may analyze all incoming positional information, but only retain or utilize positional information indicating that a mobile device user has arrived at, or left, a location for which system 100 is configured to track visits by mobile device users. For example, in one embodiment, system 100 may be configured to analyze positional reports of mobile device users moving among stores in a shopping mall and therefore system 100 may only retain and utilize (e.g., for the purposes of traffic pattern analysis and destination prediction) positional reports indicating that a user has arrived at or left one of the stores. In other embodiments, however, system 100 may be configured to retain and utilize positional reports indication how (e.g., by what geographic path, trail, or avenue) a mobile device user is traveling between locations.

Additionally, the number of locations previously visited by a mobile device user used by system 100 when determining a next location may vary from embodiment to embodiment. For example, in some embodiments, only those locations visited within a certain amount of time may be used to determine a next destination. In other embodiments, system 100 may analyze a mobile device user's past movements in order to determine those locations that may be considered a part of the user's current path, pattern or trail and use those locations to determine a next destination. In yet other embodiments, system 100 may be configured to only consider locations within a particular geographic or logical area, such as to only consider the stores within a shopping mall, for example. In still other embodiments, system 100 may allow the mobile device user to determine when system 100 should start and stop tracking the user's movements and therefore only locations visited by the user within that time frame (e.g., between the time the user initiates and concludes system 100's tracking) may be used to determine a next destination. In other words, a mobile device user may be able to define a 'session' during which system 100 tracks the user's movements, determines next destinations and possibly sends advertising content to the user.

Positional information regarding the current location of a mobile device user may be obtained in any of various manners, according to various embodiments. For instance, mobile devices are increasingly required to provide Global Positioning Information, such as to support 911 and other emergency services. Thus, mobile device 110 may determine its current location using signals from Global Positioning Satellites 130 and transmit its current location to a mobile service provider 195, such as via the mobile device normal wireless communication, such as via a network of communication towers 140, such as mobile, cellular and/or satellite communication towers. Thus, in some embodiments, the location of a mobile device user may be tracked via GPS data provided by the device itself. In various embodiments, mobile device 110 may represent a mobile (e.g., cellular) phone, a GPS navigation device (either handheld or vehicle installed), pager, or generally any wireless device, such as a PDA or other handheld computer, that can be tracked positionally and treated as a mobile device for the purposes path-dependent advertising, predicting and/or recommending destinations.

Alternatively, the location of a mobile device user may be determined by cell-signal triangulation by mobile service provider 195. As radio, wireless and cellular signal triangulation is well understood in the art, the details thereof will not be discussed herein. In general, any method of determining the location of mobile device user may be used to provide mobile device user traffic patterns or trails for analysis as described herein.

The mobile service provider 195 may provide a service of distributing mobile device user's locations via any of various means, such as via a web-based interface over network 120, according to different embodiments. In some embodiments, the mobile device user may have signed up or agreed to have his/her movements tracked and to have positional information regarding their movement be analyzed and included in data utilized by system 100 to determine traffic patterns, user trails, and to predict, suggest and/or recommend destinations. For instance, a mobile device user's service contract with mobile service provider 195 may include language giving mobile service provider 195 permission to track the user's movements and/or to provide positional information regarding the user's movements to third parties, such as to system 100 for traffic pattern analysis, path-dependent advertising, predicting and or recommending destinations. A in-vehicle navigational device may also include (either as installed or via an update) aggregated navigational trail information and the navigational device may be configured to analyze the vehicles movement according to the navigational information to recommend destinations and/or to provide advertising content for destinations, as described herein.

Additionally, in some embodiments, a mobile device user may be able to turn on and off the reporting of positional information as desired and to turn on or off the receipt of any path-dependent advertising and or recommended destinations. In yet other embodiments, a mobile device user may allow positional information regarding his/her movements to be tracked, provided to third parties and used in traffic pattern analysis, path-dependent advertising, predicting and recommending destinations while also opting out of receiving any path-dependent advertising content, coupons, or recommended destinations.

In some embodiments system 100 may be configured to communicate with mobile server provider 195 over network 120 to obtain the location of mobile device users. In other embodiments, mobile service provider 195 may be configured to expose an application programming interface (API) or other protocol for providing positional and location information regarding mobile device users.

In some embodiments, system 100 may be configured to obtain (or receive) location information regarding mobile device users from different mobile service providers 195. System 100 may be configured to store the location information in trail information 180 for current or future analysis. For example, system 100 may be configured to continuously receive and analyze positional information regarding many different mobile device users over the course of days, weeks, months or even years. System 100 may store the individual positional reports, such as in any suitable database format and/or alternately may aggregate the positional information for multiple mobile device users.

Additionally, system 100 and/or traffic analysis engine 150 may be configured to analyze positional information regarding the movements of multiple (even numerous or many) mobile device users to determine traffic patterns or user trails among various locations and destinations indicated by the positional information. System 100 may also utilize various mapping or other geographic information to identify various locations of interest. For example, system 100 may maintain access to positional and geographic location information that may include or be annotated with place names and location boundaries (such as by using GPS data) and system 100 may compare such geographic location information against positional information regarding mobile device user's movements to determine locations visited by the mobile device user.

According to some embodiments, system 100 may analyze navigational path information in order to suggest potential destinations to mobile device users. For example, if user trail information indicates that a high number of mobile device users visit location L2 from location L1, system 100 may suggest location L2 as a potential destination to mobile device users currently visiting location L1. Similarly, if user trail information analysis indicates that a high number of users visit location L3 from location L2, advertising or coupons for location L3 may be sent to mobile device users currently visiting location L2. Additionally, in some embodiments, system 100 may determine potential destinations for a mobile device user based on multiple locations visited by the mobile device user.

Thus, system 100 may utilize user trail analysis to determine the location at which to send advertising content to mobile device users. For example, system 100 may communicate advertising content for location L2 to mobile device users currently visiting (or that have recently left) location L1 if user trail analysis indicates that locations L1 and L2 are "near" or "proximate" each other according to user trail analysis. In other words, two locations may be considered near each other if mobile device users visit both locations within a short amount of time even if the two locations are not necessarily physically near each other. For example, system 100 may determine that a large number of mobile device users may drive to a particular restaurant after attending a baseball game at a particular ballpark. Thus, system 100 may consider the restaurant "near" or "proximate" the ballpark for the purposes of traffic pattern or user trail analysis. Additionally, system 100 may send advertising content for the restaurant to mobile device users that are current at or have recent left the ballpark.

While described herein as being performed mainly by traffic pattern analysis system 100, traffic pattern analysis, path-dependent advertising, determining and recommending destinations, as described herein, may also be performed by other systems, such as mobile service provider 195, according to some embodiments. In other embodiments, portions of the functionality described herein to system 100 may be performed on other system, such as mobile service provider 195. In other words, in some embodiments, various portions, action, analysis, etc., described herein as being performed by system 100 may be distributed to, or among, other systems.

In general, a user trail may be generated by a mobile device user visiting a number of locations in a particular order. The trails of a number of mobile device users may be aggregated, such as over time, and analyzed to determine traffic patterns or aggregated navigational paths. Analysis of such traffic patterns and user trail information may determine that certain locations are more popular than others and that a high number of users visit a particular location from another location or that a high number of users visit a certain set of locations as a group. In other words, two sites that are otherwise unrelated may both be accessed by a high number of common mobile device users.

Additionally, according to some embodiments, mobile device users may be tracked while driving and advertising content may be sent to the users for locations they are likely to pass by or visit based on their recent and current traffic patterns. For example, mobile device users may be sent coupons for stores, businesses or vendors based on predicting the mobile device user's likely next destination. For instance, mobile device users whose recent driving pattern indicates that they are likely headed to the airport may be sent coupons for a parking service near the airport. Similarly, mobile device users may be tracked as they move around an airport and coupons may be sent for food venders near the users' likely destination within the airport. In other words, by analyzing how a person moves through the airport, the system may predict the person's likely destination within the airport (e.g., which concourse, etc.) and the system may then send coupons to the person's mobile device offering discounts at various vendors (food, newsstands, souvenir shops, etc.) near the person's predicted destination.

According to various embodiments, "advertising content" may represent any form of communication to the mobile devices of tracked users regarding one or more locations likely (such as based on traffic pattern analysis) to be visited by the mobile device users. In one embodiment, electronic coupons or other advertisements may be sent to the mobile device of the tracked user. In another embodiment, "advertising content" may include wireless, cellular, text or other messages recommending (with or without advertising content) particular locations.

In yet other embodiments, advertising content may be communicated to devices other than the mobile device of a tracked user. For instance, in some embodiments, advertising content may be sent to a public display device 170 near a tracked user or along a pathway likely to be taken by the tracked user, such as may be based on navigational path information and/or locations recently visited by the tracked user. Thus, in some embodiments, system 100 may be configured to communicate advertising content, not to the mobile device, but to some other advertising content display system likely to be viewed by the mobile device user. For instance, a kiosk, or other electronic sign, in a mall may include a display device and may be configured to receive and display advertising content. As another example, an electronic billboard or sign along a street, road or highway, such as along a road to a particular location (e.g., store, vender, restaurant, entertainment venue, sports, venue, tourist venue, etc.) may be configured to receive and display advertising content directed to a particular mobile device user traveling along the road.

Thus, system 100 may be configured to determine one or more public display devices associated with a path likely to be taken by the mobile device user traveling to the predicted destination. A public display device that is "associated with a path" may include device located at virtually any location along or near the path including a user destination at the start, end or along the path. The public display device may be considered "associated with a path" when the device is located at virtually any location viewable from a user traveling along a path or trail between a current location for the mobile device user and the predicted destination.

Thus, after determining a likely destination for a mobile device user, system 100 may also determine that the user may also pass by a electronic display device capable of receiving and displaying advertising content, which may be updated whenever a tracked mobile device user is likely to pass by. Advertising content for the likely destination may then be sent to the public display system. As described herein, the advertising content may include an advertisement for a particular location, store, venue, product, service, etc., and may also indicate a special price, coupon, or other deal if the mobile device user makes a purchase at the advertised location.

In some embodiments, the advertising content, whether delivered to the mobile device or to a public display system, may be personalized, such as to include the mobile device user's name, to aid in gaining the mobile device user's attention to the advertising content. For instance, in one embodiment, a mobile device user may be tracked while attending an amusement park. System 100 may determine that the mobile device user is leaving an area of rides and entering an area of gift, souvenir and/or other shopping. In response, system 100 may send advertising content for a gift shop (that the user is likely to pass) to an electronic sign or other public display device recommending the gift shop and including the mobile device user's name. Additionally, system 100 may send advertising content to both the user's mobile device and one or more public display systems. For example, in one embodiment, advertising content may be displayed on a public display device while a short textual, graphic, or other message may be sent to the user's phone alerting them to the displayed advertising content on the public display device. In one embodiment, system 100 may be configured to communicate with the user's mobile device to cause the device to beep or make another audible alert as well as, or instead of, displaying a message alerting the user to the displayed advertising content.

In some embodiments, system 100 may be configured to send advertising content, either for a single location or for multiple locations, to multiple public display systems. For instance, in one embodiment, system 100 may send advertising content to each of multiple public display systems in turn, such as to engage a mobile device user multiple times as they travel toward a next likely destination. Furthermore, each public display system may display a different advertising content as different mobile device users travel past, according to some embodiments. Additionally, in some embodiments, public display systems may be capable of printing physical (e.g., paper) advertising content, such as coupons, and/or may also be capable of playing audio messages of either advertising content or to draw the mobile device user's attention to the displayed advertising content.

In some embodiments, analysis of user trail information may indicate that more users visit a first location from a second location than visit the first location from a third location. For example, more users may visit location L1 from location L2 than visit location L1 from location L3. Thus, the owner of location L1 may desire to send advertising for location L1 to mobile device users at or near location L2. According to one embodiment, system 100 may send advertising content for location L1 to the mobile device users on behalf of the owner of location L1. Thus, in some embodiments, current mobile device user traffic pattern information may be used to determine when and where (e.g., when a mobile device user is at or near a location) to communicate advertising content for a particular location. In other embodiments, the system may send more than one advertisement or coupon to a mobile device user in order to provide advertisements for each of several mostly likely locations to be visited by the mobile device user.

In another embodiment, however, the publisher may send advertising content for location L1 to mobile device users at or near location L3 in order to generate more traffic from location L3 to location L1. Also, an advertiser may pay more for delivery of advertising content to mobile device users at locations that are more proximate (e.g., according to traffic pattern trails and not necessarily physical proximity) the advertised location than for delivery of advertising content to mobile device users at locations that are less proximate the advertised location. For example, if user trail information indicates that a majority of mobile device users travel from location L1 to location L2 than travel from location L3 to location L2, an advertiser may pay more to advertise location L2 to mobile device users at location L1 than to mobile device users at location L3. In other embodiments, however, an advertiser may pay more to advertise location L2 to mobile device users at location L3 than to mobile device users at location L1. In general, the cost of targeted advertising to mobile device users based on user trail information may vary according to, or may be dependent upon, the proximity of locations visited by, or likely to be visited by, a mobile device user.

Referring to FIG. 1, network(s) 120 may include any suitable data network or combination of networks configured for communicating content requests and content between traffic pattern analysis system 100 and mobile service provider 195. For example, network 120 may include one or more Local Area Networks (LANs) such as Ethernet networks, as well as Wide Area Networks (WANs), Metropolitan Area Networks (MANs), or other data or telecommunication networks implemented over any suitable medium, such as electrical or optical cable, or via any suitable wireless standard such as IEEE 802.11 ("Wi-Fi"), IEEE 802.16 ("WiMax"), etc. In various embodiments, all or a portion of network 120 may encompass the network infrastructure commonly referred to as the Internet. In other embodiments, network 120 may be entirely contained within an enterprise and not directly accessible from the Internet.

As noted above, the pattern of mobile device users' movements may indicate paths or trails among various locations. In some embodiments, the traffic pattern and resultant trails of many different users may be aggregated over time to determine aggregated pattern or trail information. For example, if many different mobile device users travel from one location to another, a pattern or trail may be considered to exist between the two locations. Similarly, if many different mobile device users travel from the second location to a third location, the trail may be extended from the first location to the third location via the second location. Additionally, more than one traffic pattern or trail may exist between or among a set of locations. For instance, using the same three locations mentioned above, one trail may exists from the first location to the second location and on to the third location, while another trail may exist from the first location to the third location without passing through the second location, indicating that some mobile device users travel from the first location to the third location without visiting the second location.

When analyzing a mobile device user's traffic pattern, the system may record, such as in trail information 180, the identification of the person's current location as well as any other locations that the person has visited within a fixed amount of time (e.g., in the last hour). In some embodiments, service provider 195 may supply positional information to system 100 for analysis. In other embodiments, however, service provider 195 may perform some or all of the traffic pattern analysis described herein. System 100 may store positional and location information in any of various forms. System 100 may analyze positional information regarding a number of mobile device users in order to identify or determine patterns, paths and/or trails among various locations visited by mobile device users. For example, by determining locations visited by various mobile device users and the order in which those locations were visited, system 100 may identify one or more patterns between and/or among those locations. The identified trail, pattern or path information may be used or taken into account when analyzing another mobile device user's movements among the same locations. Moreover, system 100 may be configured to compare one mobile device's movements to patterns, paths and trail identified from analysis of other mobile device's movements, such as to determine a likely next destination.

Additionally, system 100 may be configured to analyze a mobile device's movement in order to recognize anomalous movements or movements that deviate from recognized user paths, according to some embodiments. For example, system 100 may determine that a mobile device user has deviated from traffic patterns indicated in aggregated navigation information. In some embodiments, system 100 may track and/or analyze a mobile device user's anomalous and/or deviate movements in order to recognize or determine a new trail between locations. In other embodiments, system 100 may determine that a mobile device user has deviated from a recognized user trail and may communicate information regarding the fact that the user has deviated from the recognized trail, such as to aid the user navigationally (e.g., in case the user has lost their way). For example, system 100 may determine that a user has visited several tourist-related locations in a city but has deviated from recognized user trails traveled by tourists. In response, system 100 may be configured to inform the user that they are no longer following recognized traffic patterns and may recommend a next destination from the recognized user trails. In yet other embodiments, system 100 may inform a mobile device user that has deviated from recognized user trails regarding the locations along the user's current line of movement, such as to warn a tourist about entering a dangerous neighborhood or to warn a festival attendee that they are leaving the festival grounds and/or to lure them back into the festival by displaying a coupon for a vendor within the festival grounds.

In yet other embodiments, system 100 may be configured to communicate a mobile device user's deviant movements (e.g., movements that deviate from aggregated user trails) to people and/or entities other than the mobile device user, such as to venue management personnel. For example, system 100 may alert authorities that a mobile device user is moving into a restricted area. System 100 may also be configured to detect potentially stolen vehicles, cargo or other goods based on determining that a mobile device has deviated from recognized traffic pattern and/or user trails. In general, determining whether and when mobile device users deviate from recognized user trails may indicate an "interest anomaly" to be further tracked and analyzed. For example, over time, system 100 may determine and maintain information on "deviant" trails and recognize when a mobile device user travels along a deviant trail.

System 100 may also create a weighted link between the various locations visited by the mobile device user, in some embodiments. Additionally, the current mobile device user's path or trail may be compared to other user's paths to determine a next most likely destination. For example, the number of traversals between two locations may be recorded and maintained. In other words, if a current mobile device user has visited locations A, B, and C and system 100 determines that a majority of the mobile device users that visit locations A, B and C also visit location D, the system may send advertising content for location D to mobile device users currently at locations A, B and/or C.

Furthermore, different trails, patterns or paths may be identified as being used by different types of mobile device users. For example, different age groups of mobile device users may use different patterns or trails among locations. Similarly, different demographic information may be utilized by system 100 to identify various groups of mobile device users and the paths or trails used by those respective groups when moving among locations. In other words, demographic information regarding a mobile device user may be used, at least in part, when determining a next likely destination for the mobile device user. Additionally, information regarding previous purchases may also be used, as least in part, when determining a next likely destination or when determining particular advertising content to send to a mobile device user, according to various embodiments.

System 100 may be configured to use any of various analysis methods when analyzing positional information to determine patterns, trails, predicted destinations, etc., according to different embodiments. For example, in one embodiment, system 100 may divide the number of traversals by mobile device users from A to B by the total number of traversals to location B and use the result as the probability of another mobile device user traversing from location A to location B. System 100 may also determine the probability of traversing from location A to other locations as well. When a mobile device user is at or leaving location A, the system may send advertising content, such as coupons, based on the location that has the highest probability of be visited from location A, according to some embodiments.

In some embodiments, different locations that are accessed by mobile device users in close proximity to another location may be considered near or proximate the other location. For example, when navigational pattern information indicates that mobile device users travel from a first location to a second location and then on to a third location, the three locations may be considered "near" or "proximate" each other. In one embodiment, the first location may be considered nearer, or more proximate, the second location than the third location and the third location may be considered nearer, or more proximate, the second location than the first location. As used herein a location may be considered near or proximate another location based on the fact that mobile device users visit the two locations within a certain amount of time or without visiting other locations and may not be related to the actual physical proximity of the two locations. For example, in one embodiment system 100 may be configured to track mobile device users' movements among stores in a shopping mall and only the stores in the mall may be considered locations or destinations for traffic pattern analysis. In some embodiments, system 100 may only consider a mobile device user to have visited a location (e.g., a store in this example) when the mobile device user is actually inside the store and not merely walking by the store. As mobile device users visit different stores, system 100 may determine various traffic patterns or user trails among the stores. For example, some mobile device user may only visit clothing retailers while other mobile device users may only visit music stores. In other embodiments, other criteria may be utilized to determine when a mobile device user is actually visiting a location.

Path-dependent advertising content may be delivered automatically by system 100 whenever the system determines a likely future destination for a mobile device user. Additionally, in other embodiments, the mobile device user may request a coupon for a particular store or may request a recommendation of one or more destinations. A mobile device user may have signed up for a service in which coupons and other advertising are offered via their mobile device or via one or more public display devices. When the person visits a store, he can either have a coupon automatically provided or suggested to him or he may request a coupon (either for his current location or for a recommended future destination).

In some embodiments, other demographic information regarding the mobile device user may also be analyzed and used to predict a most likely destination. For instance, the identity of the mobile device user may be known and therefore demographic segmentation that might drive purchasing behavior may be taken into account when predicting a predicted next destination for the mobile device user. For example, the age of the mobile device user may be taken into account when determining a next predicted destination. In some embodiments, whether or not the mobile device user is local or from out-of-town may be determined and different navigational path information may be used when predicting potential destinations. For instance, tourists may travel along different paths or trails than those used by local mobile device users and the system may be configured to maintain and utilized different sets of aggregated navigational information according to whether a mobile device user is local or from out-of-town, according to one exemplary embodiment. Similarly, the system may supply tourist related information, such as recommended destinations visited by other tourists or may supply local information to tourists, in various embodiments.

The system may record demographic information regarding mobile device users along with the other information regarding mobile device traffic patterns. For instance, when determining a next predicted destination from location A, younger mobile device users may be most likely to visit location B from location A, whereas older mobile device user may be more likely to visit location C from location A. Thus, information other than just the mobile device user's recent locations and traffic patterns may be used when determining a next destination.

Coupons or other advertising content may be for particular products or service or may be more generally directed to the store, vendor, or location. Demographic information regarding a mobile device user may be used to determine one or more particular products to feature in the advertisement or coupon. Coupons may be provided for products that have not be previously purchased by the mobile device user but which the user is likely to purchase according to "traditional market-based analysis" of the user's purchases. For instance, system 100 may be configured to analyze information regarding recent purchases by a mobile device user when determining a next likely destination and may also take a user's recent purchases into account when determining or selecting the advertising content to communicate to the user. For example, if system 100 determines that a mobile device user just purchased a very expensive dress, system 100 may send advertising content, such as to the user's mobile device or to a public display system, recommending and/or advertising either a high-end shore store and/or a high-end accessory boutique.

In other embodiments, system 100 may be configured to track mobile device users as they move around within a store, such as a grocery or department store, and to determine a next or predicted destination within the store based on the user's current and recent path information through the store. System 100 may then communicate advertising content to the user (e.g., to the user's mobile device or to a public display device) advertising or recommending the predicted destination within the store. System 100 may also include advertising content (or a coupon) for one or more specific products based on the areas of the store already visited by the mobile device user. For instance, in one embodiment, system 100 may track a mobile device user around a store and determine that the user is likely to visit the dairy section next and may delivery advertising content for one or more dairy products to the mobile device user. As described above, system 100 may communicate the advertising content to the user's mobile device or to a public display device within the store, or both. For example, system 100 may communicate the advertising content to a coupon-printing device that the mobile device user is likely to pass on the way to the dairy section. System 100 may also alert the user to the advertising content, such as by causing the mobile device to play an audio alert (e.g., a beep or special ring tone) or to display a message alerting the user to the displayed advertising content. Additional information, such as the mobile device user's purchasing history, aggregated path information for other users may also be used by system 100 when determining a next location for the mobile device user and when determining the particular advertising content to display to the user.

In some embodiments, system 100 may be able to obtain or receive demographic information including information regarding mobile device users' previous purchases via a third-party system. In other embodiments, however, system 100 may be configured to receive recent purchase information regarding a mobile device user from an integrated purchasing system at the locations visited by the mobile device user. In yet other embodiments, the mobile device may also be integrated with a purchasing system, such as to allow a user of the mobile device to make purchases using, for example, an electronic purchasing or commerce system executing on the mobile device.

In some embodiments, a small software or firmware program may be installed on the mobile devices to report GPS information. In other embodiments however, the system may receive location information regarding mobile device users from mobile device service provides. If a software program is installed on the mobile device, the system may be configured to send more detailed advertising and/or coupons. The coupons may be delivered to the mobile device in a number of manners, such as via a mobile device call, an email message to the mobile device, a text message to the mobile device, etc.

Various criteria may be used to determine whether one location is proximate another location or to determine whether one location is more proximate than another location to a third location, according to different embodiments. In another words, a level of proximity may be determined for various locations in relation to a particular location. For example, in one embodiment, the number of locations visited by mobile device users between two other locations may be used a measure of whether one location is proximate another. Thus, a given number of hops taken by mobile device users between two locations may determine whether the two locations are proximate. Additionally, the number of hops between two locations may correspond to a level of proximity between the two locations. In another embodiment, the number of mobile device users that travel a particular path or trail or the number of users that visit two locations, whether or not every mobile device user follows the same path between the locations, may determine whether the two locations are proximate. In yet another embodiment, the amount of time between when mobile device users access two locations may be used as a criterion to determine how proximate the two locations are.

Additionally, mobile device user quality, or aggregate user quality, may be used to determine the proximity of locations. As noted above, demographic information based on the identity of mobile device users may be available in some embodiments and may be used to determine a level of user quality. A level of quality may indicate the likelihood that an individual user may purchase particular types of items or visit particular types of locations. For instance, the average or aggregate quality of all users that visit two locations may be used to determine whether the two locations are proximate. Those mobile device users determined to be more likely to make a purchase may be considered of higher quality for determining the proximity of two locations visited by those mobile device users. Similarly, information regarding other locations visited by users, users' occupation, household income level, recent purchases, etc. may be used, at least in part, to determine a mobile device user's level of quality. Thus, a location visited by mobile device users of higher average quality may be considered to be more proximate to a particular location than a site visited by users by lower quality.

A user's level of quality may be different for different locations or destinations, according to different embodiments. For example, one user may be considered high quality for one type of store, such as a jewelry store, but may be considered low quality for another type of store, such as a teen-oriented music store. Similarly, a user may be considered of high quality for the music and of lower quality for the jewelry store. Additionally, a user's level of quality may be different for different stores of the same type. For example, a user may be considered of high quality for a less expensive jewelry store but considered of lower quality for a store selling higher-end, custom jewelry. Thus, system 100 may not determine or maintain a single measurement of quality for an individual mobile device user. Instead, system 100 may be configured to determine a measure of quality for a user based on individual (or particular types of) destinations. In other words, a user's level of quality may vary based on the particular destination or location for which the user's level of quality is being determined.

In some embodiments, system 100 may be configured to only send coupons or advertisements for a particular location to mobile device users of a certain level of quality. For example, a high-end jewelry store in a shopping mall may only desire to advertise to mobile device users of a certain level of quality. Thus, various factors and/or criteria may be used to determine which locations to advertise to which mobile device users. In the jewelry store example above, the jewelry store may also desire to advertise to mobile device users that are currently visiting (or recently left) another jewelry store in the same shopping mall. Similarly, while an average car rental company may desire to advertise to any and/or all mobile device users waiting an the baggage terminal of an airport, a high-end limousine company may only desire to advertise to mobile device users of a certain level of quality or that also visited the airports executive (e.g., first class or business class) lounge.

Additionally, when more than one trail or path exists among various locations, the different tails may be weighted according to various techniques. For example, in one embodiment, the amount of actual traffic, e.g. the number of mobile device users, traveling along a particular path may be used to weight different user trails. Thus, a trail which more users travel may be weighted more heavily that a trail that fewer users travel, according to one embodiment. In another embodiment, more recently traveled trails may be weighted more heavily that trails that have not been traveled as recently. Additionally, the weighting of trails or individual links or hops along trails traveled by mobile device users between locations may be used, at least in part, when determining a possible or predicted next destination for a mobile device user. Thus, system 100 may be configured to take into account the weighting of individual links for hops along user trails and the weighting of complete trails between locations when determine a next likely destination for a mobile device user. Additionally, since a mobile device users' likely or predicted destination may be used to determine what advertisement or coupons to send to the user's mobile device, the weighting of user trails may, at least in part, determine what coupon or advertisement may be displayed to the user (e.g., on the user's mobile device and/or displayed on one or more public display devices).

As described above, system 100 may receive position information regarding a mobile device user from custom or specialized software running on the user's mobile device. For example, as illustrated in FIG. 1, mobile device 110 may include positioning reporting logic 160 configured to report the mobile device position (such as according to GPS information) to system 100, either directly or via the user's mobile service provider 195. For example, in one embodiment, position reporting logic 160 may represent custom software or firmware configured to capture and/or report a mobile device user's navigational activity.

In some embodiments, position reporting logic 160 may be configured as a self-contained, platform-independent software module that may be downloaded, remotely invoked or otherwise obtained from a third party (e.g., the party providing traffic pattern analysis system 100) and implemented with minimal alteration to the configuration of mobile device 110. Upon activation, position reporting logic 160 may be configured to report the mobile device's current location and/or recent position history (e.g., more than one location) to traffic pattern analysis system 100 in a manner that is generally transparent to the other operations performed by mobile device 110.

Traffic pattern analysis system 100 may, in some embodiments, be configured to store received traffic pattern and user trail data using any suitable format or methodology. For example, traffic pattern analysis system 100 may store such data in arrays, tables, trees, databases, hashed structures or other suitable data structures, either internal to traffic pattern analysis system 100, such as in trail information 180, or distributed among one or several external systems (not shown) such as database systems, file systems, etc. In some embodiments, traffic pattern analysis system 100 may store historical content request traffic data for arbitrary periods of time, while in other embodiments data older than a threshold age (e.g., days, months, etc.) may be automatically purged or moved to secondary storage.

Generally speaking, recording information regarding the navigational path taken by a mobile device user to a particular location may be conceptually similar to an insect marking its path with a pheromone. If a sufficient number of users travel to a particular location through a certain set of paths, those paths may be distinguished from other paths (e.g., random paths) via the accumulation of "pheromone" (e.g., recorded traffic information). It is noted, however, that the use of the term "pheromone" in this context is purely illustrative or metaphorical and that some characteristics of biological pheromones may not be directly applicable to analysis of content request traffic as described herein.

Additionally, mobile device users' traffic patterns and user trails may be analyzed in various manners according to different embodiments. For example, U.S. patent application Ser. No. 11/321,890, titled Method and System for Determining Interest Level of Online Content Navigational Paths, filed Dec. 29, 2005, which is hereby incorporated by reference in its entirety, describes various ways and manners of analyzing network users trail information as online users access various network resources, such as web sites, online databases, etc., and such ways and manners may be applied to mobile device trails and travel patterns.

As noted above, advertisers, such as store owners, vendors, etc., may desire to bid on delivering advertising to mobile device users, such as to have an advertisement for a particular location (e.g., store, restaurant, kiosk, etc.) be displayed to mobile device users when the advertised location is determined, such as by system 100, to be a predicted next destination for the mobile device user. Thus, in some embodiments, system 100 may communicate with one or more other computer systems (not shown) to facilitate automated bidding for placing of coupons or advertising content on mobile device of users likely to visit the advertised location. As automated and computerized bidding systems are well understood in the art, the details of such a system will not be discussed herein.

Additionally, the cost charged for delivering advertising content to mobile device users may be based on navigational pattern or user trail information, according to some embodiments. For example, the highest rates may be charged for display of advertising to mobile device users who are on or associated with more popular user trails (e.g., trails that have higher traffic volume). In some embodiments, the cost of delivering advertising content to a mobile device user may vary depending upon how proximate the advertised location is to the location of the mobile device user when the advertising content is displayed.

In some embodiments, a mobile device user may request a coupon or advertisement for a location proximate to the user's current location. For instance, a mobile device user visiting various vendors at a flea market may request a recommendation of other locations or vendors to visit and, in response, system 100 may determine a new location (which the mobile device user has not visited recently, for example) based on the user's currently location and, in some embodiments, based on the locations the mobile device user has recently visited. In other words, the locations recently visited by a mobile device user prior to visiting the user's current location may effect or change the location or locations recommended, according to some embodiments.

Additionally, when recommending locations or destinations to a mobile device user, system 100 may also take into account previously determined user trails among the locations proximate to the mobile device user's current and recent locations. For example, system 100 may recommend a location to a mobile device user based on aggregated traffic pattern of other mobile device users. In some embodiments, additional demographic information about the mobile device user may be used to select a particular destination to recommend. Thus, system 100 may recommend one or more destinations visited by other mobile device users that fall into the same or similar demographic segments as the requesting mobile device user.

Figure 2:
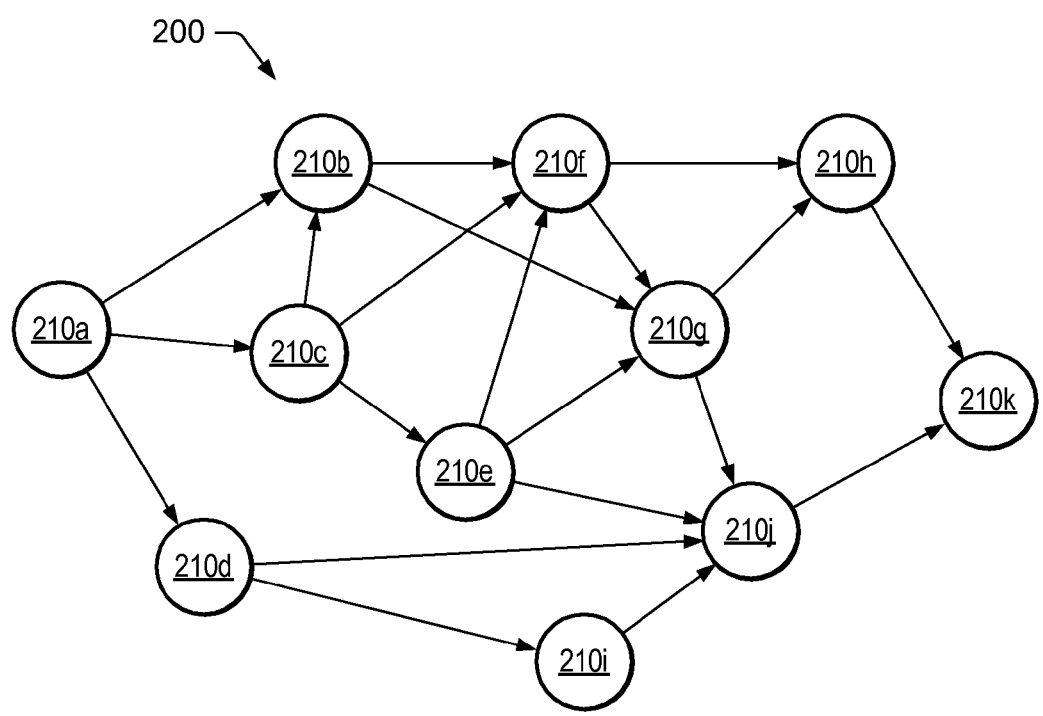
FIG. 2 illustrates one embodiment of a navigational pattern information diagram representing mobile device user navigation paths among locations.

A sequence of paths in which the destination of one path functions as the origin of another path may be referred to as a navigational pattern or user trail. A collection of locations or destinations may present a variety of navigation paths and user trails along which a mobile device user travels from one location to another. Relationships or user trails among locations may be represented as a network or graph, of which one embodiment is illustrated in FIG. 2.

In the illustrated embodiment, navigational pattern information 200 is shown to include a number of locations (e.g. stores, vendors, kiosks, entertainment venues, restaurants, etc.) 210a-k. Locations 210 may encompass, for example, any of the various types or configurations of locations or destinations discussed previously. Paths relating different locations 210 are shown as directional arrows between the related locations. Thus, for example, paths exist between location 210a and locations 210b-d. By contrast, no direct path exists between location 210a and locations 210e, although a mobile device user might travel between these locations via location 210c. In some instances, where one path exists from a first location 210 to a second location 210, other paths may also exist that lead from the second location 210 back to the first location 210, either directly or via some other location 210. Consequently, it is possible that cycles may exist within navigational pattern information 200, although for simplicity of exposition these are not shown in the illustrated embodiment.

It is noted that navigational pattern information 200 may represent relationships between locations 210 at the level of mobile device user travel. The paths shown in navigational pattern information 200 may or may not correspond to physical paths, roads, or other directly physical connections among the locations. For example, two locations 210 may be adjacent in navigational pattern information 200 if a mobile device user navigates from one to the other.

In some embodiments, navigational pattern information 200 may represent the order in which mobile device users visited various locations and not the actual physical paths taken between those locations. For instance, in a shopping mall, mobile device users may visit a store at location 210*a* and then walk to the other end of the shopping mall to visit a store at location 210*b*. If the mobile device user did not visit any other stores on the way, navigational pattern information 200 may represent a single hop between the two stores even through the mobile device user may have walked past many other stores along the way. In other embodiments, however, navigational pattern information 200 may record and take into account the locations a mobile device user may pass when traveling between two locations. Additionally, system 100 may send coupons or advertisements to a mobile device user (either directly to the mobile device or to a public display system) for stores or other locations that the user may pass while traveling to a next destination. For example, system 100 may have recommended that the user visit a particular location and may also send advertisements for locations along the path the user is likely to take to arrive at the recommended location.

Conversely, locations that are close in terms of physical geography may be distant in terms of the navigation path topology of navigational pattern information 200. For example, even though two locations may be physically adjacent, few if any mobile device users may travel directly from one of the locations to the other. Thus, in some embodiments, the navigation path topology represented by navigational pattern information 200 may differ or diverge from the physical geography of the locations included in navigational pattern information 200. Since, in some embodiments, the user trails indicated by navigational pattern information 200 may be identified through an analysis of actual mobile device users' movements, the representation of navigational pattern information 200 may not represent every possible navigation path that exists among locations 210. Rather, it may represent only those paths for which an actual traversal by a mobile device user has been reported.

As mentioned above, numerous navigational paths or user trails may exist within navigational pattern information 200. However, different paths may vary, sometimes substantially, with respect to various measures of path usage. In some embodiments, a representation of navigational pattern information 200 may include indications of weights along the paths between locations 210, where the weights may reflect any suitable measure of usage or activity of the corresponding path. For example, paths between certain locations may be traversed by a high volume of mobile device users relative to paths between other locations. In one embodiment, a measure of navigation volume of a path, such as a number of path traversals per unit of time, may be assigned as a weight of that path. Alternatively, some paths through navigational pattern information 200 may exhibit a substantial rate of change relative to other paths. Correspondingly, in one embodiment a time rate of change of the number of traversals of a given path may be assigned as a weight of that path.

For a given location 210, path weight information may be used in generating advertising or destination recommendations from the set of locations near the given location 210. For example, path weights may be used to rank the paths from location 210*b* in decreasing order, such that location 210*f* ranks highest followed by locations 210*c* and 210*e*. Thus, when determining predicted next destinations for mobile device users from location 210*b*, location 210*f* may be advertised or suggested prior to or given more weight than, or be associated with higher priced advertising than, locations 210*c* or 210*e*. Similarly, location 210*b* may be considered near or proximate locations 210*a*, 210*c*, 210*e*, 210*f* and 210*g*, according to one embodiment. Therefore, in one embodiment, path weights may be used to rank the paths from location 210*a* in decreasing order, such that location 210*b* ranks highest followed by locations 210*d* and 210*c*. Thus, when determining predicted next destinations to advertise or recommend to mobile device users at location 210*a*, location 210*b* may be advertised or suggested before locations 210*c* or 210*d*.

As noted above, the placement of advertising content (e.g., where the mobile device user is when advertising is sent) may also be determined based on navigational paths or user trails. Thus, in some embodiments, an advertisement for location 210*b* may be sent to mobile device users at or near one or more of the locations near 210*b*, such as locations 210*a*, 210*c*, 210*e*, 210*f* and/or 210*g*. For ease of discussion, the above examples only locations that are directly adjacent (within navigational pattern information 200) to a particular location are indicated as near that location. In other words, in the above example, a location is proximate another location if navigational pattern or user trail information indicates that mobile device users travel from one of the locations to the other location. In the above example, two locations may be considered near or proximate each other regardless of whether mobile device users travel from one location to the other or vice versa. In other words, location 210*b* may be considered near location 210*f* and 210*c*, according to some embodiments. However, advertising for location 210*b* may not be sent to mobile device users at location 210*f* if navigation pattern information 200 indicates that mobile device users are likely to move from location 210*b* to location 210*f* and not the other way. In other embodiments, however, other metrics or relationships between locations may be utilized to determine a location's proximity to another location. For example, locations within a specified number of links or hops within navigational pattern information 200 may be considered near each other (regardless of the locations' actual physical proximity). For example, in one embodiment, locations that are within two link or "hops" may be considered near each other. Thus, in such an example, locations 210*b*, 210*c*, 210*d*, 210*e*, 210*f*, 210*i* and 210*j* may all be considered near location 210*a*, since they are all within two hops of location 210*a*.

Additionally, as described above, other metrics or techniques other than the number of hops between locations, indicated by navigational pattern information, may used to determine whether two locations are proximate each other and therefore possible destinations from each other. For example, in one embodiment, if one or more mobile device users visit two locations within a specified period of time the two locations may be considered near each other. Similarly, user quality, such as based on demographic information and/or the identity of the mobile device user, and other criteria may be used to determine a level of proximity between two locations. Additionally, as noted above, advertising content may also be sent to public display systems rather than, or in addition to, sending advertising content to the user's mobile device.

Figure 3:
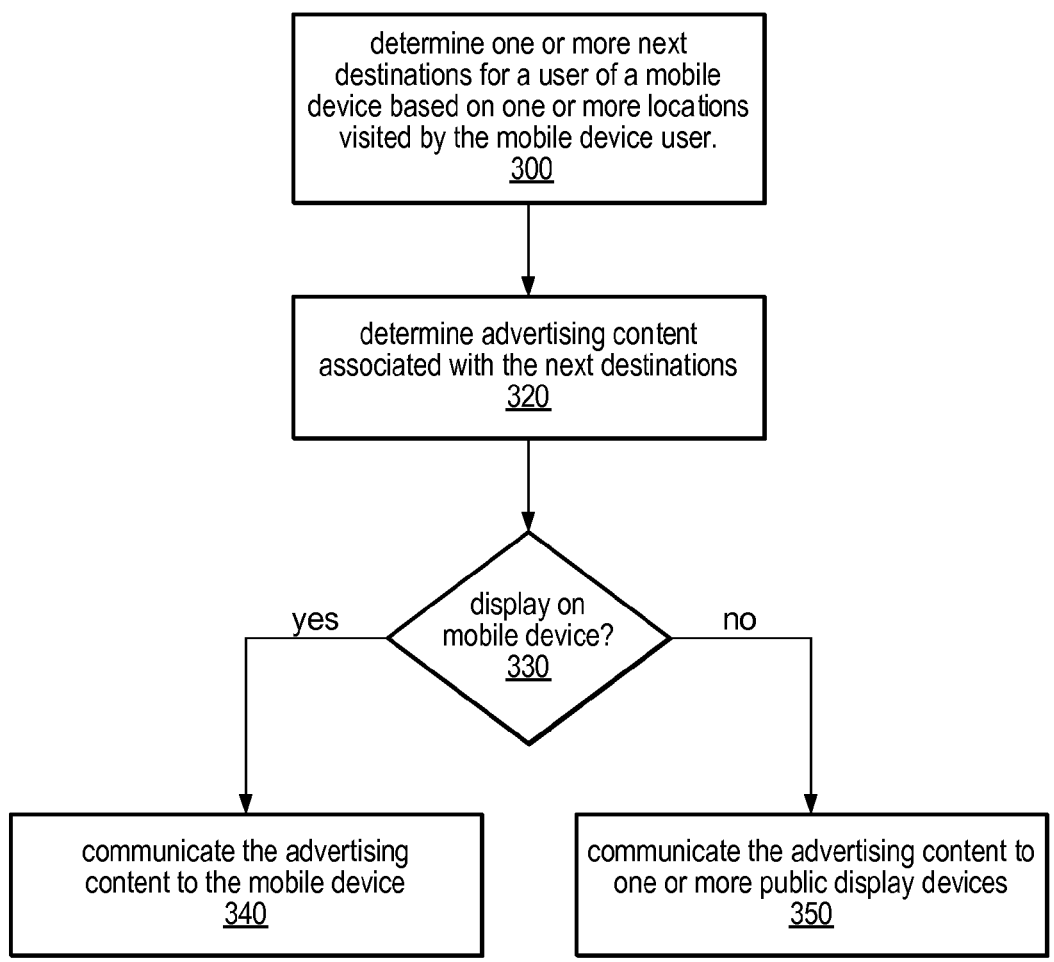
FIG. 3 is a flowchart illustrating one embodiment of a method for delivering advertising content to a mobile device for a next destination for mobile device user.

FIG. 3 is a flowchart illustrating one embodiment of a method for delivering advertising content to a mobile device for a predicted next destination for mobile device user. As illustrated by block 300, system 100 may be configured to determine one or more predicted destinations for a mobile device user based on one or more locations visited by the mobile device user. For example, as described above, system 100 may receive positional information, such as GPS information, regarding a mobile device user and may determine a location or destination likely to be visited by the mobile device user. As noted above, system 100 may determine a predicted next destination for a mobile device user automatically in some embodiments.

In other embodiments, however, system 100 may determine a predicted destination for a mobile device user in response to a request from the mobile device user. For instance, a mobile device user may request a recommendation as to a destination. For example, custom software or firmware on the mobile device may enable the mobile device user to send a request to system 100, either directly or via mobile service provider 195, for a recommended destination. In some embodiments, a mobile device user may also be able to request a coupon and/or a recommended destination from system 100.

In yet other embodiments, system 100 may track mobile device users movements and only when a mobile device user's recent traffic patterns indicate that the user is traveling alone certain traffic paths or user trails will system 100 determine a predicted next destination for the mobile user.

When determining a likely destination for a mobile device user, system 100 may select a predicted destination based on the user's current location, such as selecting a store physically adjacent to or near the mobile device user's currently location, according to one embodiment. In other embodiments, however, system 100 may be configured to analyze the current user's recent movements in relation to historical or aggregated traffic patterns of other mobile device users among the same locations. Thus, system 100 may analyze navigational pattern information, such as navigational pattern information 200, to determine one or more locations likely to be visited by the mobile device user. In general, any of methods and techniques described above regarding analyzing traffic patterns may be utilized by system 100 to determine a likely destination for a mobile device user.

As described above, various criteria may be used to determine if one location is within a given proximity of another and therefore a potential next destination for a mobile device user, according to different embodiments. As used herein two locations' proximity may be based on mobile device users traffic patterns and may not necessarily be based on the two locations' physical geography. For example, in one embodiment, one location may be considered proximate (i.e. within a given proximity of) to a particular location if a number of mobile device users visit both locations within a specified amount of time. The time limit used to determine whether one location is within a given proximity of another may vary from embodiment to embodiment. For instance, two locations may be considered proximate each other if they are visited within a certain number of minutes in one embodiment.

In another embodiment, two locations may be considered proximate if they are both visited within a number of hours or days. In other embodiments, the number of links or hops along a navigational path or trail between the two locations, or alternatively, the average number of hops along several paths, may be used to determine whether they are within a given proximity. In yet other embodiments, the number of users visiting both locations, possibly with a specified amount of time or using only a specified number of hops, may be used to determine the proximity of two locations. Additionally, a number of locations may also be ranked according to how proximate they are to a particular location. In general, any criteria used to determine whether two locations are within a given proximity may also be used to rank various locations according to how near or proximate they are to a particular location.

In some embodiments, system 100 may be configured to only consider locations within a given proximity to a mobile device user's current location when determining potential or predicted destinations for the user. For example, in one embodiment, system 100 may only consider locations within a single link or hop of a mobile device user's current location in the network traffic information when determining a predicted next destination for the user. In other embodiments, however, system 100 may be configured to consider any location along a mobile device user's current trail or path when determining predicted next destinations.

Additionally, the quality of the users visiting locations may be used both to determine whether one location is within a given proximity of another location and/or to rank the relative proximity of various locations. For instance, user profile information, demographic information or characteristics of other locations visited by similar (e.g., in terms of demographic segment or user profile) mobile device users may be used to determine or rank the quality of mobile device users visiting locations. In one embodiment, a location may be considered proximate a particular location if the quality of mobile device users that visit the particular location from the other location meet a certain criteria. For example, if the users also visited a number of locations related to luxury items or if they recently made a number of purchases, those users may be ranked higher in quality than other users. Thus, the quality of users that visit a particular location via certain network paths or that also visit other proximate locations may be used, at least in part, to determine the proximity of locations as well as to determine a predicted next destination for mobile device users.

After determining one or more predicted destinations for the mobile device user, system 100 may be configured to determine advertising content associated with the predicted destinations, as indicated by block 320. For example, in one embodiment, system 100 may select one particular electronic coupon from among various available coupons to send to the mobile device user. For instance, system 100 may analyze additional information regarding the mobile device user, such as demographic information based on the identity of the user, to select a particular electronic coupon or other advertisement for a particular product at one of the predicted destinations. Similarly, system 100 may determine which of several predicted destinations to advertise on the user's mobile device based on, among other criteria, the locations recently visited by the mobile device user, a level of quality assigned to the mobile device user, or the recent or historical popularity of the destination among other mobile device users (either generally or more narrowly among other mobile device users in the same demographic segment).

As described above, system 100 may be configured to communicate the advertising content to the mobile device 110 of the user and/or to a public display device 170. Thus, as indicated by decision block 330, system 100 may determine whether or not to display the advertising content on the mobile device of the tracked user. For example, in one embodiment, user preferences or other system policies may dictate whether or not advertising content is displayed on a user's mobile device or not.

If system 100 determined that the advertising content should be displayed on the user's mobile device, as indicated by the positive output of decision block 330, system 100 may communicate the advertising content to the mobile device of the mobile device user as indicated by block 340, according to some embodiments. In other embodiments, however, advertising content may be communicated, as illustrated by block 350, to one or more public display systems near the mobile device user or near, along, or viewable from a path likely to be traveled by the mobile device user, as indicated by the negative output of decision block 330. As described above, system 100 may deliver advertising content to mobile device users in any of various manners, according to different embodiments. For instance, in one embodiment, system 100 may send a graphic image of a coupon or advertisement to the user's mobile device. In other embodiments, system 100 may utilize text messaging, audio advertising via a telephone call, or other methods of delivering advertising content to a mobile device.

Figure 4A:
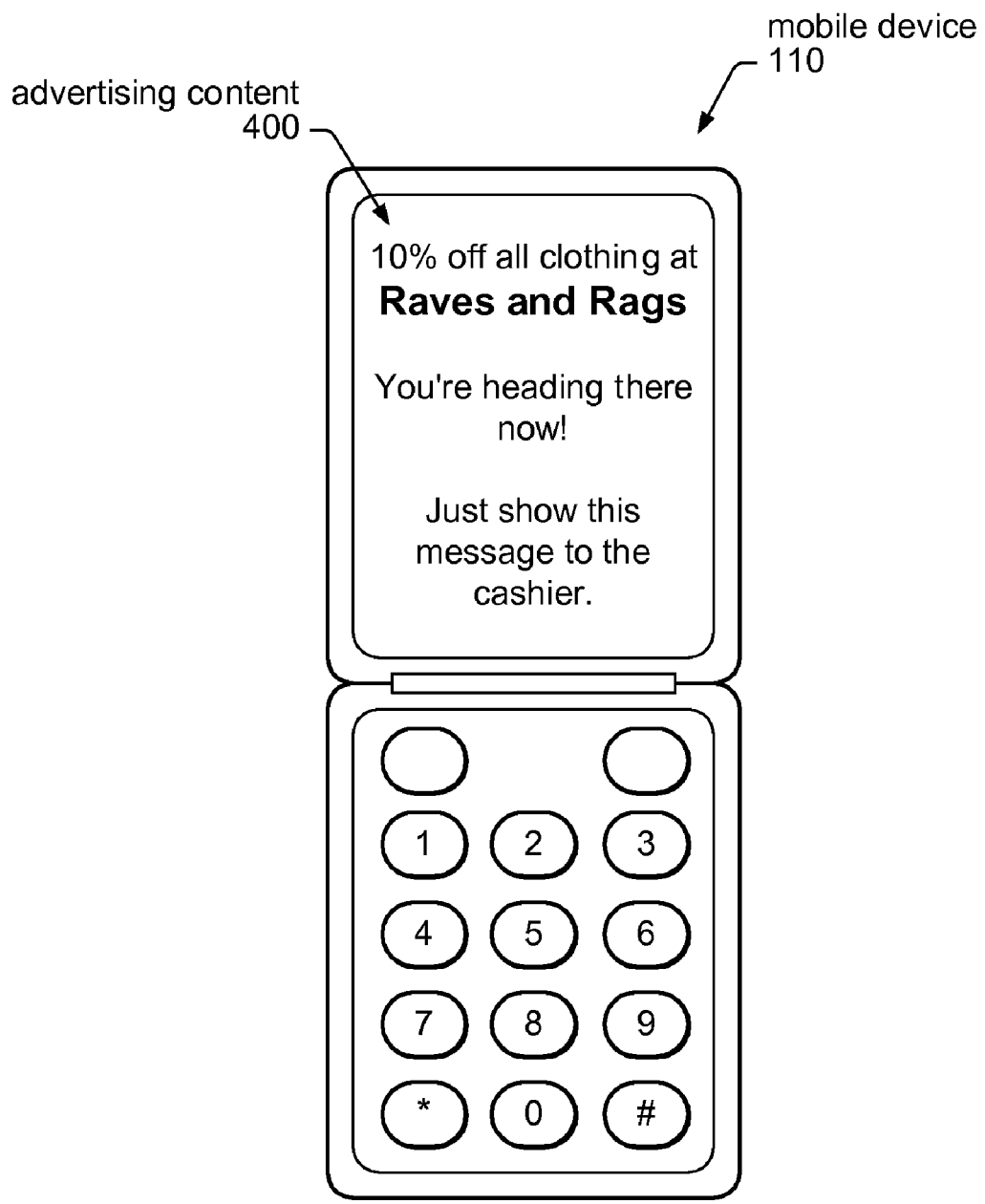
FIG. 4A is a block diagram illustrating an example mobile device displaying advertising content for a determined next destination, according to one embodiment.

FIG. 4A is a block diagram illustrating an example mobile device displaying advertising content for a determined predicted next destination, according to one embodiment. As described above, system 100 may, in some embodiments, send advertising content, such as an electronic coupon or other advertisement regarding a predicted next destination for a mobile device user. Thus, mobile device 110 may receive from system 100 advertising content 400, which may be an electronic coupon advertising special pricing at a predicted next destination of the user of mobile device 110. In some embodiments, advertising content 400 may a text message, instant message, or graphic image sent to mobile device 110. As is well known, there are many ways in which information, such as advertising content 400 may be communicated to a mobile device. In some embodiments, mobile device 110 may be Internet or web enabled and system 100 may be configured to send advertising content 400 to mobile device 110 as an email message, URL, URI or other Internet-enabled communication protocol.

Additionally, information regarding the effectiveness of coupons, ads or other advertising content may be recorded and used, as least in part, when subsequently determining advertising content. For example, if a particular type or version of advertising content is never acted upon by the user receiving it, system 100 may determine not to send that particular type or version of advertising content to mobile device users. Similarly, if a particular type or version of advertising content is acted upon by mobile device users, system 100 may determined to send that particular type or version of advertising content to additional mobile device users when appropriate, according to some embodiments.

FIG. 4A illustrates advertising content 400 representing an electronic coupon offering a special price at a particular store, according to one embodiment. In other embodiments however, advertising content 400 may not represent a coupon, but instead may represent another advertisement, such as one directing the mobile device user to a particular location. While not illustrated in FIG. 4A, in some embodiments, advertising content may not be visual in nature. For example, in one embodiment advertising content 400 may be an audio message, such as a pre-recorded or computer-generated recording, sent to mobile device 110.

In some embodiments, such as illustrated in FIG. 4A, advertising content 400 may include instructions on how to take advantage of any special offers or deals mentioned in advertising content 400. For example, the mobile device user may need to show or play (e.g., in the case of audio-based advertising content) the advertising content on the mobile device to a cashier or other staff at the advertised location to obtain any advertised prices, offers or deals. In other embodiments, however, the mobile device user may only have to mention that they received advertising content 400 to receive any relevant special offers. Additionally, in some embodiments, advertising content 400 may include an indication that the mobile device user is already heading toward, or is likely to pass, the advertised location. In other embodiments, advertising content 400 may include directions to the advertised location.

Figure 4B:
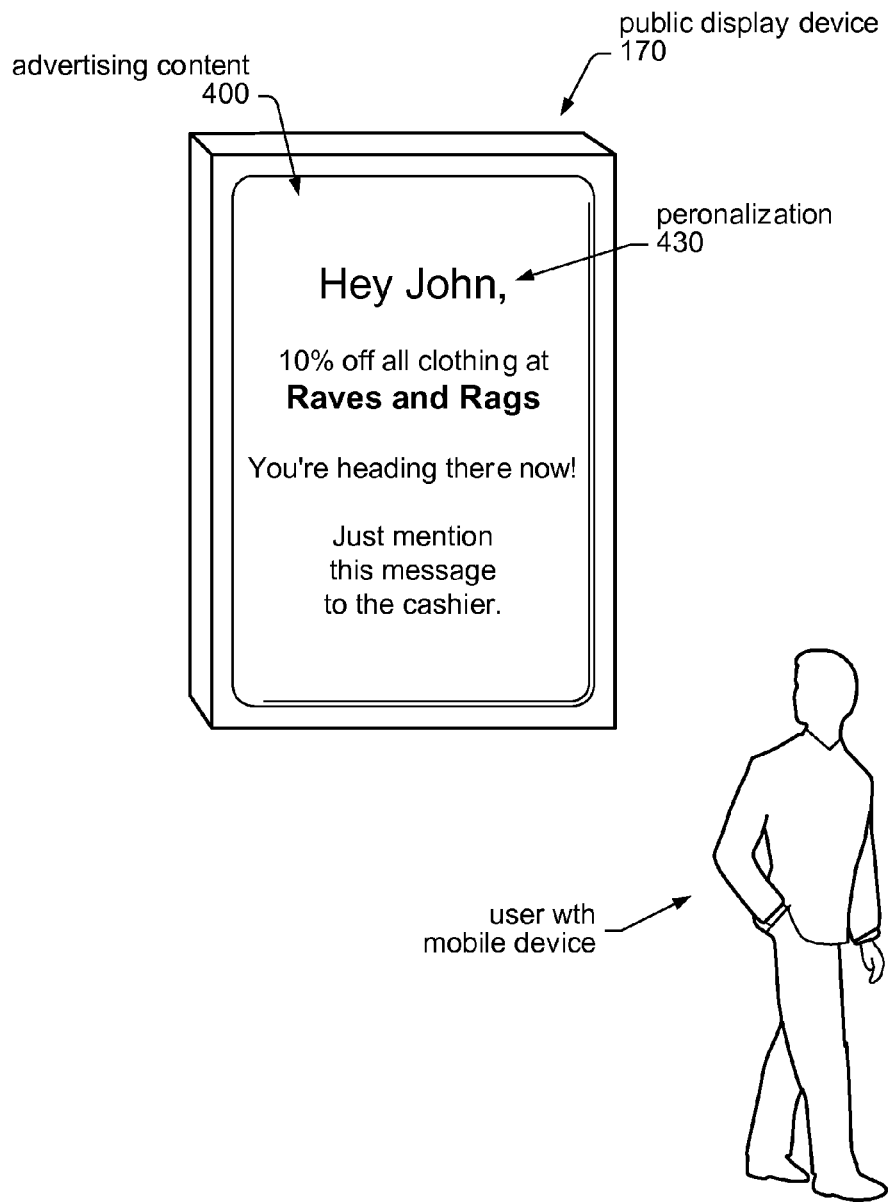
FIG. 4B is a block diagram illustrating an example electronic display device displaying advertising content for a determined next destination, according to one embodiment.

As described above, in some embodiments, advertising content may be displayed on one or more public display devices 170 instead of, or in addition to, advertising content displayed on a user's mobile device. FIG. 4B is a logical block drawing illustrating advertising content displayed on a public display device, according to one embodiment. As noted above, system 100 may communicate advertising content to be displayed on a public display device 170 that a tracked user is likely to view. For instance, a shopping mall may include one or more electronic signs, such as installed on walls, in kiosks, in windows, etc. As another example, a grocery store may include multiple display devices that are also capable of printing advertising content on paper coupons. In other embodiments, system 100 may communicate advertising content to electronic billboards, road-side signs, digital ticker tapes, scoreboards, moveable or mobile signs, aerial signs, such as a blimp with a digital ticker displaying scrolling text messages, etc. In general, system 100 may be configured to communicate advertising content for display or printing to any of various types of display devices.

Thus, in some embodiments, after determining a likely destination for a mobile device user, system 100 may also determine that the user may pass by one or more electronic display devices capable of receiving and displaying advertising content, which may be updated whenever a tracked mobile device user is likely to pass by. Advertising content for the likely destination may then be sent to the public display device. The advertising content may include an advertisement for a particular location, store, venue, product, service, etc., and may also indicate a special price, coupon, or other deal if the mobile device user makes a purchase at the advertised location, according to various embodiments.

In some embodiments, the advertising content, whether delivered to the mobile device or to a public display system, may be personalized, such as to include the mobile device user's name, to aid in gaining the mobile device user's attention to the advertising content. For instance, system 100 may be configured to personalize advertising content displayed on a public display device, such as by including personalization content 430 in the displayed advertising content, according to one embodiment. In other embodiments, personalization content 430 may be announced audibly rather then displayed visually. For instance, in one example, public display device 170 may display advertising content regarding a predicted destination and may play a personalized audio announcement to help attract the user's attention to the displayed advertising content. Additionally, as noted previously, system 100 may also cause the user's mobile device to beep or otherwise alert the user to the displayed advertising content. The details and or actual content of personalization content 430 may be determined from personal information obtained via the user's mobile device, the user's mobile service provider or other demographic information regarding the tracked user.

While FIG. 4B illustrates a single public display device, in some embodiments, system 100 may be configured to send advertising content, either for a single destination or for multiple destinations, to multiple public display devices. For instance, in one embodiment, system 100 may send advertising content to each of multiple public display devices in turn, such as to engage a mobile device user multiple times as they travel toward a destination. Furthermore, each public display system may display different advertising content as different mobile device users travel past, according to some embodiments. Additionally, in some embodiments, public display systems may be capable of printing physical (e.g., paper) advertising content, such as coupons, and/or may also be capable of playing audio messages of either advertising content or to draw the mobile device user's attention to the displayed advertising content.

Figure 5:
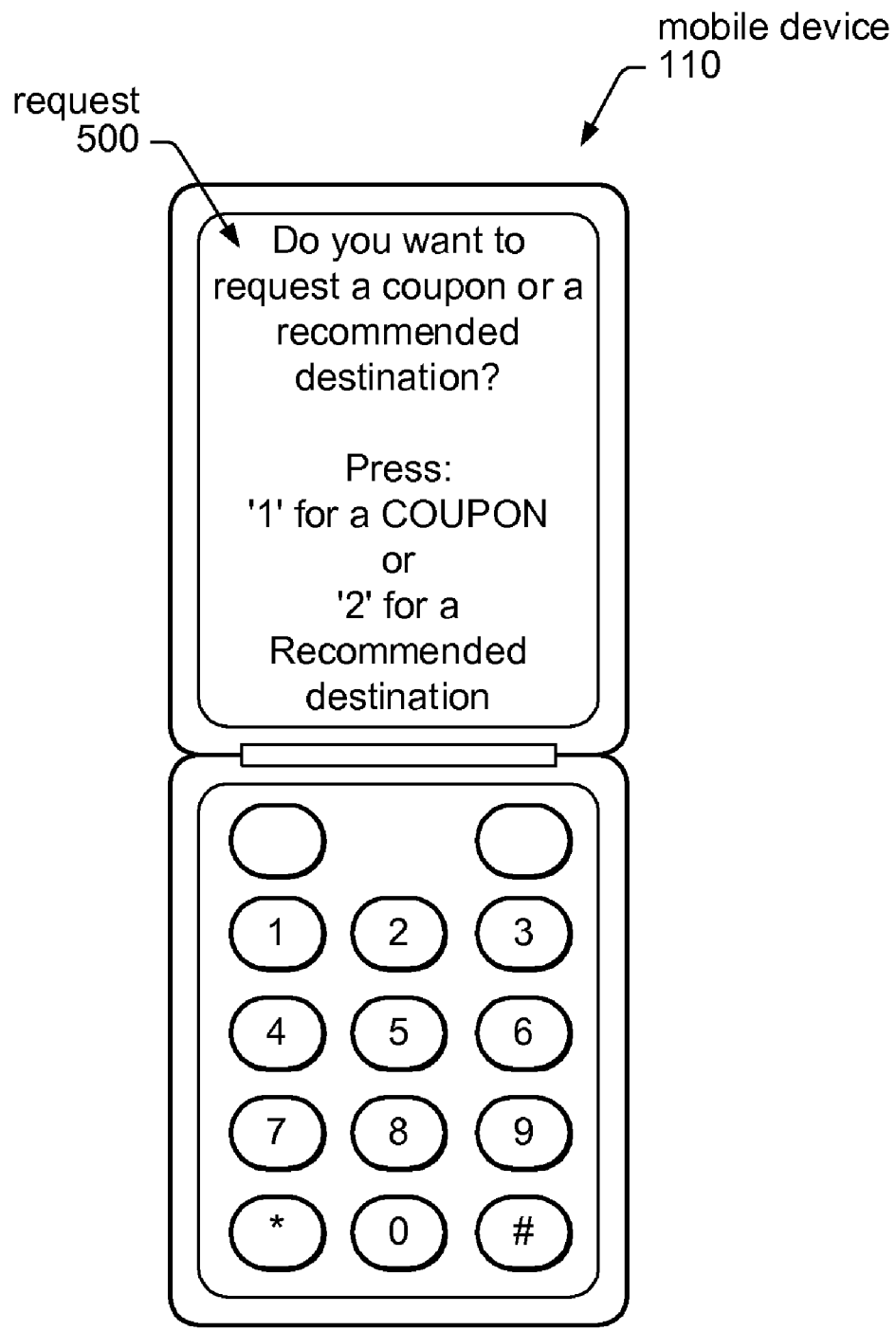
FIG. 5 illustrates an exemplary mobile device 110 displaying a user interface for allowing a user of the mobile device to request a coupon and/or recommended destination.

As described above, in some embodiments, system 100 may be configured to determine a predicted destination, and possibly send advertising content for the determined predicted destination, in response to a request from a mobile device user. FIG. 5 illustrates an exemplary mobile device 110 displaying a user interface for allowing a user of the mobile device to request a coupon and/or recommended destination. In some embodiments, mobile device 110 may include software or firmware configured to allow the mobile device user to communicate a request to system 100, as described above. FIG. 5 illustrates just one possible embodiment for a user interface that may be provided by custom software or firmware on a mobile device. FIG. 5 represents just one exemplary user interface and that mobile device 110 may be configured to communicate a request for advertising content or a recommended destination, or both, in many different manners, according to different embodiments. In one embodiment, position reporting logic 160 on mobile device 110 may also include the capability and/or may be configured to provide a user interface, or other functionality, allowing a user of the mobile device to request advertising content and/or recommended destinations.

In some embodiments, a mobile device user may be able to request advertising content (such as an electronic coupon) for use at the user's current location. For instance, a mobile device user may be browsing at a store in a shopping mall and request a coupon for the store. In response, system 100 may be configured to provide advertising content to the mobile device user for use at the user's current location.

When displaying requested advertising content, whether for use at a mobile device user's current or predicted destination, system 100 may communicate, display or otherwise provide the advertising content to any of various devices, according to various embodiments. For example, system 100 may send appropriate advertising content to the user's mobile device 110, to a public display device 170 or to a coupon printing device, such as in a grocery store aisle, or to virtually any other electronic device accessible or viewable by the user.

In other embodiments, however, a mobile device user may request a recommendation for a destination likely to be of interest to the mobile device user. In response, system 100 may be configured to determine one or more locations likely to be of interest to the mobile device user, such as based on other locations the user has recent visited, demographic information regarding the user, locations visited by other, similar mobile device users. For example, if many other mobile device users categorized in a similar demographic segment as the requesting mobile device user have visited a certain location, system 100 may recommend that location to the requesting mobile device user. In other embodiments, system 100 may determine one or more user trails, such as by analyzing navigational pattern information 200, and may recommend a location on the same trail or trails current used by the requesting mobile device user.

Additionally, a mobile device may also include a user interface allowing a user to set or specify various parameters related to receiving advertising content and/or recommended destinations, as described herein. For example, a mobile device 110 may include a user interface allowing a mobile device user to configure the number, type and frequency of coupons received, according to one embodiment. For instance, one mobile device user may desire to only receive coupons that were specifically requested while another user may desire to receive no more than one coupon an hour. Thus, a user may indicate a maximum frequency at which the user desires to receive advertising content. In addition, a user may be able to specify the types of coupons received. For instance, one user may only want to receive coupons for clothing and/or clothing accessories while another user may want to only receive coupons for restaurants and other food venues. Mobile device 110 may also be configured to allow the user to specify how the mobile device responds to communications from system 100. For example, a special ring tone, vibration, or other notification may be used when advertising content and/or recommended destinations are received on the mobile device.

Mobile device 110 may also provide a user interface allowing the user to view and/or select from among multiple received coupons (or other advertising content). For example, mobile device 110 may display a list of advertising content and/or recommended destinations received to allow the user to review and/or select one of the previously received coupons or destinations. Additionally, system 100 may be configured to communicate multiple recommended or predicted destinations to a mobile device user (e.g., based on the user's current and/or previous locations) and the mobile device may include a user interface to display a list of the recommended destinations. The list of destinations may be ranked by system 100 and/or mobile device 110 based on various criteria and/or parameters, such as user parameters (e.g., what type of destinations the user desires to visit), advertising cost (e.g., advertisers may pay more to be higher in the list), proximity to user's current location (e.g., along navigation paths), among others. In one embodiment, system 100 may be configured to continually update such a list of destinations based on the user's movements. Thus, system 100 may modify or update the list, either adding or removing destinations, as the user moves around.

Mobile device 110 may include a user interface allowing the user to review and select from among recommended destinations, according to some embodiments. For example, mobile device 110 may display a dynamically changing list of recommended destinations and may allow the user to select one of the destinations. In response to user selection of a recommended destination, mobile device 100 may inform system 100 of the user selection or may request additional information, such as advertising content, for the selected destination. In one embodiment, system 100 may communicate advertising content for at least some of the recommended destinations when initially communicating the recommended destinations to mobile device 110. Additionally, system 100 may communicate advertising content to mobile device 110 in response to a user selecting a recommended destination.

Mobile device 110 may also be configured to allow the user to filter recommended destinations and/or advertising content via a list of recommended destinations. For example, in one embodiment, a user may be able to select a particular destination and specify that the user wish to no longer receive advertising content for the selected destination in the future. Alternatively, a user may request to receive additional recommended destinations and/or advertising content for locations similar (e.g., the same type of store, restaurant, etc.) to a selected destination. Mobile device 110 may then communicate the user's preferences and/or requests to system 100 and system 100 may, in some embodiments, ensure that future advertising content and/or recommended destinations are consistent the user's preferences. In other embodiments, mobile device 110 may be configured to filter advertising content and/or recommended destinations in accordance with user preferences.

When determining a recommended or predicted destination for a mobile device user, system 100 may take into account an interest level of different potential destination to the mobile device user, according to some embodiments. For example, the interest level of different locations or destinations may be determined on the basis of actual visits by mobile device users to those locations, in some embodiments. In other words, a location that is frequently visited by mobile device users may be considered more interesting than a location that is visited less often. In some embodiments, interest associated with locations may be determined according to the behavior of people visiting that location. For example, interest may be associated with the general interest of a community of people for whom at least some degree of desire or curiosity is implicit in their acts of visiting a location. By associating a measure of location interest with actual user behavior, location interest may be determined dynamically. Indicated location interest may then rise and fall according to traffic patterns that may reflect emergent properties of a community of users. Thus, in some embodiments, system 100 may recommend locations with a higher measure of location interest than locations with lower levels of interest.

The sheer number of people that visit a location may not be the best indicator of interest. For example, major retail stores, department stores, warehouse stores and/or supermarkets may consistently attract large numbers of people every day, with relatively minor and/or predictable fluctuations in traffic relative to overall traffic volume. By contrast, a little-known, specialty shop might suddenly see its traffic grow tenfold, perhaps due to media coverage, word of mouth, etc. If location interest were purely a function of the number of people that visit a location, high volume locations with relatively consistent traffic would continually be ranked as more interesting than the little-known site that exhibits considerable variance in traffic. This may act to impair the discovery of interesting locations. That is, determining location interest solely from traffic volume (e.g., the number of people that visit the location per hour, day, etc.) may be biased in favor of preserving the level of interest of already highly-ranked locations at the expense of obscuring the level of interest of less-frequented sources.

In some cases, such a bias may be overcome by defining a measure of location interest to account for a time rate of change of traffic, rather than simply the magnitude of traffic. Such a measure may be referred to interchangeably herein as a level or indication of interest, as location interest or simply as interest. Considering the previous example, the overall rate of change of traffic for high-volume locations may be relatively small at any given time. By contrast, traffic to a little-known location may exhibit a large rate of change relative to its overall traffic volume in a short period of time during a spike in traffic. By highlighting the rate of change of traffic, the burgeoning interest in the little-known location may be brought to the attention of users who otherwise may have never become aware of the location. Thus, system 100 may be configured to utilize any suitable measure of location interest when determining a predicted destination or recommending a destination, according to some embodiments.

Figure 6:
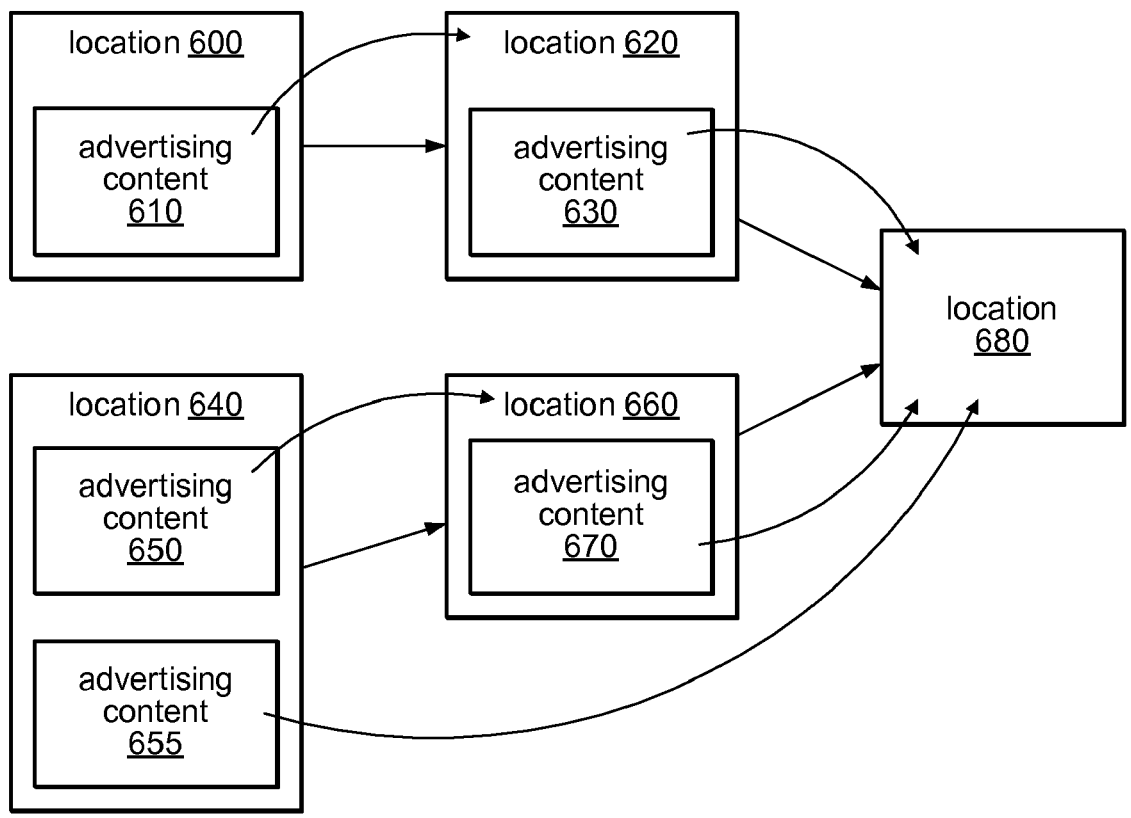
FIG. 6 is a block diagram illustrating the logical arrangement of advertising content for locations and the locations at which that advertising content may be sent to a mobile device user, according to one embodiment.

FIG. 6 is a block diagram illustrating the logical arrangement of advertising content for locations and the locations at which that advertising content may be sent to a mobile device user, according to one embodiment. As described above, system 100 may be configured to send advertising content to a mobile device user where the advertising content advertises a location likely to be visited by the mobile device user in the near future. In FIG. 6, locations 600, 620, 640, 660, and 680 may represent locations connected via traffic patterns or user trails, represented by the straight arrows in FIG. 6, according to one embodiment. For instance, the trails or patterns between and among locations 600, 620, 640, 660, and 680 may be represented in navigational pattern information 200. Advertising content 610, 630, 650, 655 and 670 illustrated in FIG. 6 may represent the advertising content sent to a mobile device user, according to some embodiments and described above. The curved arrows in FIG. 6 illustrate the respective location for which a particular advertising content advertises. In other words, advertising content 610 advertises location 620 and advertising content 630 advertises location 680. The location box in which the advertising content is illustrated in FIG. 6 represent a possible location at which the respective advertising content may be sent to a mobile device user. For example, system 100 may determine, such as based on aggregated traffic pattern information, demographic information, location interest levels, etc., that location 620 is a predicted next destination for a mobile device user currently at location 600. Thus, system 100 may send advertising content 610 (advertising location 620) to the mobile device user while the user is at or near location 600.

Additionally, in some embodiments, system 100 may be configured to send advertising content for predicted locations that are not necessarily predicted to be visited next by a mobile device user. For example, system 100 may determine that a mobile device user at location 640 is likely to visit location 680 at some point and may communicate advertising content 655 for location 680 to a mobile device user currently at location 640. In other words, system 100 may provide advertising content for locations predicted to be visited by a mobile device user even though the user may be likely to visit other locations between a current location and the advertised location.

In some embodiments, system 100 may pre-determine, based on aggregated traffic pattern and location interest, and/or other information, advertising content for particular locations and may determine locations at which that advertising content should be sent to mobile device users. In other words, system 100 may maintain a database, or other store, associating advertising content with locations at which it may be sent to mobile device users whose likely next destination is determined to be the location advertised by the respective advertising content. In other embodiments, however, system 100 may not utilize such predetermined and/or stored associations of advertising content with the locations at which it should be sent to mobile device users. Instead, in some embodiments, system 100 may determine predicted destinations and advertising content for those predicted destinations dynamically as a mobile device user is traveling between locations.

As illustrated in FIG. 6, navigational pattern information 200 may indicate a user trail from location 600 to location 620 and on to location 680. Similarly, the navigational pattern information may indicate a user trail from location 640 to location 660 to location 680. As described above, system 100 may send advertising content to mobile device users currently at locations from which users travel to location 680 (such as based on navigational pattern information 200). Thus, navigational pattern information 200 may be used to determine one or more locations proximate location 680 from which mobile device users may travel to location 680, such as locations 620 and 660. Thus, advertising content 630 and 670 for location 680 may be sent to mobile device users currently at or near locations 620 and 660, respectively. Similarly, advertising content for location 620 may be sent to mobile device users current at or near location 600 and advertisements for location 660 may be sent to mobile device users currently at or near location 640.

The above-described logical arrangement between locations at which advertising content may be sent to mobile device users and the locations advertised by that advertising content represents only one possible embodiment. In other embodiments, advertising content for a particular location may be sent to mobile device users currently at locations less proximate that those illustrated in FIG. 6. For instance, in one embodiment, advertising content for location 680 may be sent to mobile device user currently at location 600. For instance, system 100 may have determined that while both location 620 and location 680 are likely next destinations for a mobile device user currently at location 600 and may also have determined that location 680 has a higher measure of location interest than location 620 and therefore may send advertising content for location 680 to the mobile device user at location 600. Additionally, a higher price or other compensation may have been paid by the owner of location 680 and therefore system 100 may send advertising content for location 680 even through location 620 may be a more likely destination for the mobile device user currently at location 600.

Figure 7:
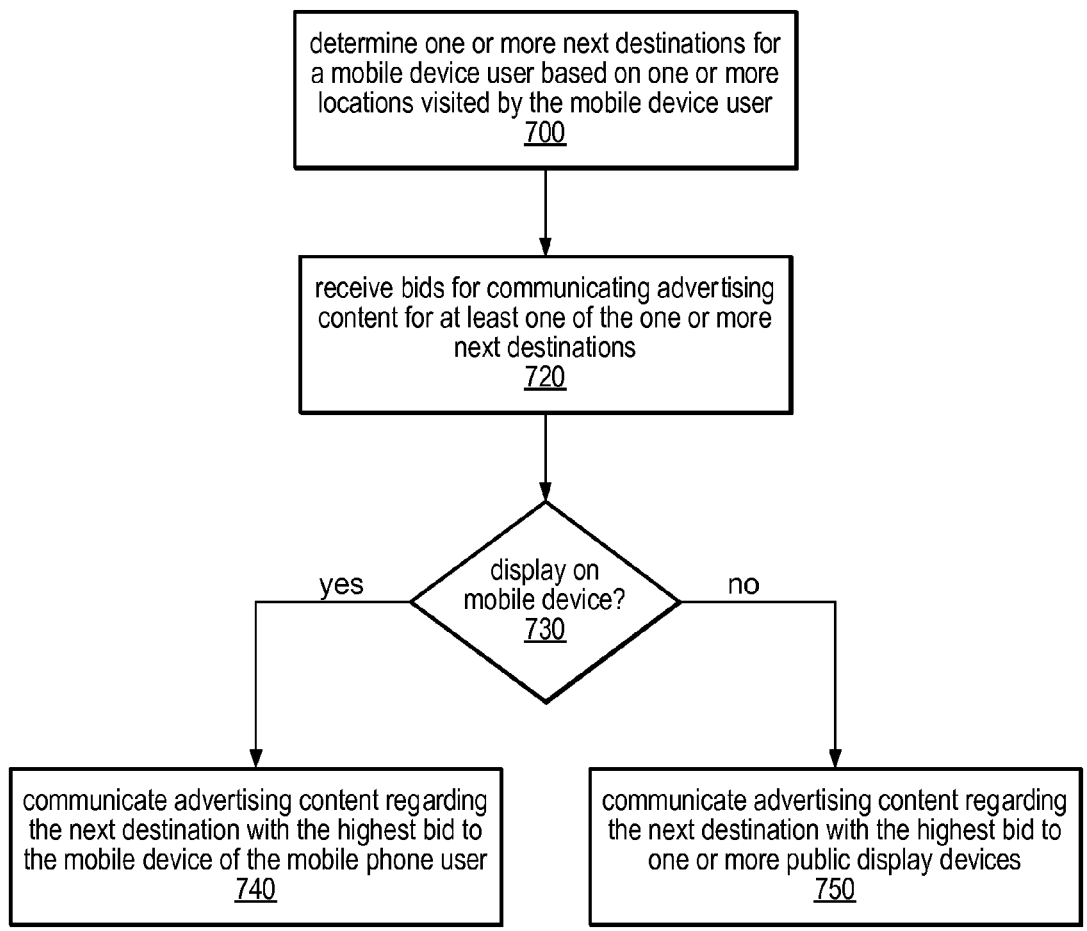
FIG. 7 is a flowchart illustrating one embodiment of using bids for advertising content to determine which location to advertise when sending advertising content to a mobile device user.

Additionally, as described above, in some embodiments, system 100 may hold or receive the results of an auction for placing advertising content on mobile devices. FIG. 7 is a flowchart illustrating one embodiment of using bids for advertising content to determine which location to advertise when sending advertising content to a mobile device user. In general any of the criteria described above regarding determining whether a network site is within a given proximity of another site or for ranking the relative proximity of sites may be also be used when bidding on or associating advertising content with network site.

As indicated by block 700, system 100 may determine one or more predicted destinations for a mobile device user based on one or more locations visited by the mobile device user. For example, system 100 may determine one or more predicted or likely next destinations for a mobile device user based on the user's current location and/or based on other locations recently visited by the user. Additionally, as described above, system 100 may analyze and use other information, such as location interest measures, demographic information, user quality, and other criteria, when determining likely next destinations for mobile device users.

Thus, in some embodiments, system 100 may represent, incorporate, or be associated with an advertising broker for directing advertising content to mobile device users. As will be discussed in more detail below, the price that a storeowner, shopkeeper, venue manager, etc., may be willing to pay, or bid, for providing advertising content to mobile device users may be based, at least in part, on various information determined from user trails. For example, advertising content sent to mobile device users current at locations that are near (e.g., in terms of traffic patterns or user trail and not necessarily geographic nearness) the advertised location (as determine by any of various criteria described herein) may be more expensive than advertising content sent to mobile device user that are current at locations that are further away from the advertised location. Similarly, advertising content sent to mobile device users currently at locations from which more traffic travels to the advertised location, whether directly or indirectly, may be more expensive than locations with less volume of traffic traveling to the advertised location.

Thus, advertising content for a location may be sent to mobile device users currently on frequently used user trails to the advertised location. For example, if navigational path information indicates that a large number of mobile device users navigate from the location of a boat rental service to the location of a fishing guide service, system 100 may send advertising content for the fishing guide service location to mobile device users current at the boat rental service location, according to different embodiments.

After determining one or more predicted destinations for the mobile device user, system 100 may receive bids for providing advertising content for at least one of the one or more determined predicted destinations, as illustrated by block 720. For example, system 100 may be configured to communicate with an online, possibly automated, bidding or auction service allowing location agents, such as storeowners, shopkeepers, venue managers, etc., to bid on have advertising content for their locations be provided to mobile device users likely to visit their respective location. In some embodiments, an auction or other bidding service may hold online auctions in real time and system 100 may be configured to receive the results of a real-time auction, or other bidding system, when determining advertising content to provide to a mobile device user. In other embodiments however, advertisers may be able to bid in a non-real-time fashion for the placement of advertising content on mobile devices at various locations. For instance, advertisers may bid on displaying advertising content to mobile device users based on aggregated navigational pattern information, such as navigational pattern information 100, described above. In general, any suitable method for communicating and receiving bids for providing advertising content to mobile device users as described herein and according to various embodiments.

Additionally, in some embodiments, locations may be ranked by other user trail related criteria, such as the number of hops between two locations or the amount of time between a mobile device user visiting two locations, among other criteria. For example, referring back to FIG. 2, when ranking locations near location 210f, locations 210b, 210c, and 210e may be ranked higher than location 210g. In some embodiments, locations from which users travel to a particular location may be ranked higher than locations to which users travel from the particular location. For example, when ranking locations that are proximate location 210c, location 210a may be ranked higher than locations 210b or 210e, according to one embodiment. In other embodiments, the reverse may be true and locations 210b and 210e may be ranked higher than location 210a.

Thus, advertising pricing or bid prices for providing advertising content to mobile device users at one of the proximate locations may be determined according to the ranking of each proximate location. For example, when determining pricing for advertising site 210e, sending advertising content to mobile device users at location 210c may be more expensive than for sending the advertising content to mobile device users at location 210a. After receiving the bids as described above regarding block 720, system 100 may, in one embodiment, communicate advertising content regarding the destination with the highest bid to the mobile device user, as described above. In other embodiments, system 100 may be configured to communicate advertising content regarding multiple destinations in a ranked order according to a ranking of the received bids (e.g., from higher to lower). Thus, after receiving the bids as described above regarding block 720, system 100 may, in one embodiment, determine to display the advertising content on the user's mobile device, as indicated by the positive output of decision block 730. If so, system 100 may communicate advertising content regarding the destination with the highest bid to the mobile device user, as indicated by block 740. Alternatively, system 100 may communicate the advertising content regarding the next destination that received the highest bid to one or more public display devices, as indicated by block 750 and described above.

In some embodiments, the determination of a bid price and the placing of a bid for providing advertising content to mobile device users may be performed automatically, or semi-automatically by an application or computer system, according to some embodiments. For example, such computer system may be configured to take part in an auction for providing advertising content to mobile device users and may also include a user interface allowing a location agent, such as a storeowner, shopkeeper, etc., to control the bidding. The determination of a bid price and the placing of a bid for providing advertising content may be performed in real-time, near real-time or not in real-time, according to various embodiments.

Additionally, system 100 may be configured to rank the determined predicted next destination of a mobile device user according to any of various navigational path characteristics. For instance, in some embodiments, system 100 may be configured to rank the predicted destinations according to how near they are to a mobile device users current location. Similarly, locations agents, or their computer systems, may determine how much to bid or pay (e.g., without an auction) for providing advertising content to mobile device users based on the ranking of the predicted destinations. For instance, locations agents may be prepared to bid relatively higher for advertising content sent to mobile device users currently at a location that is nearer to the advertised location, as described above. In other embodiments, locations may be ranked and pricing determined according to other user trail criteria.

Figure 8:
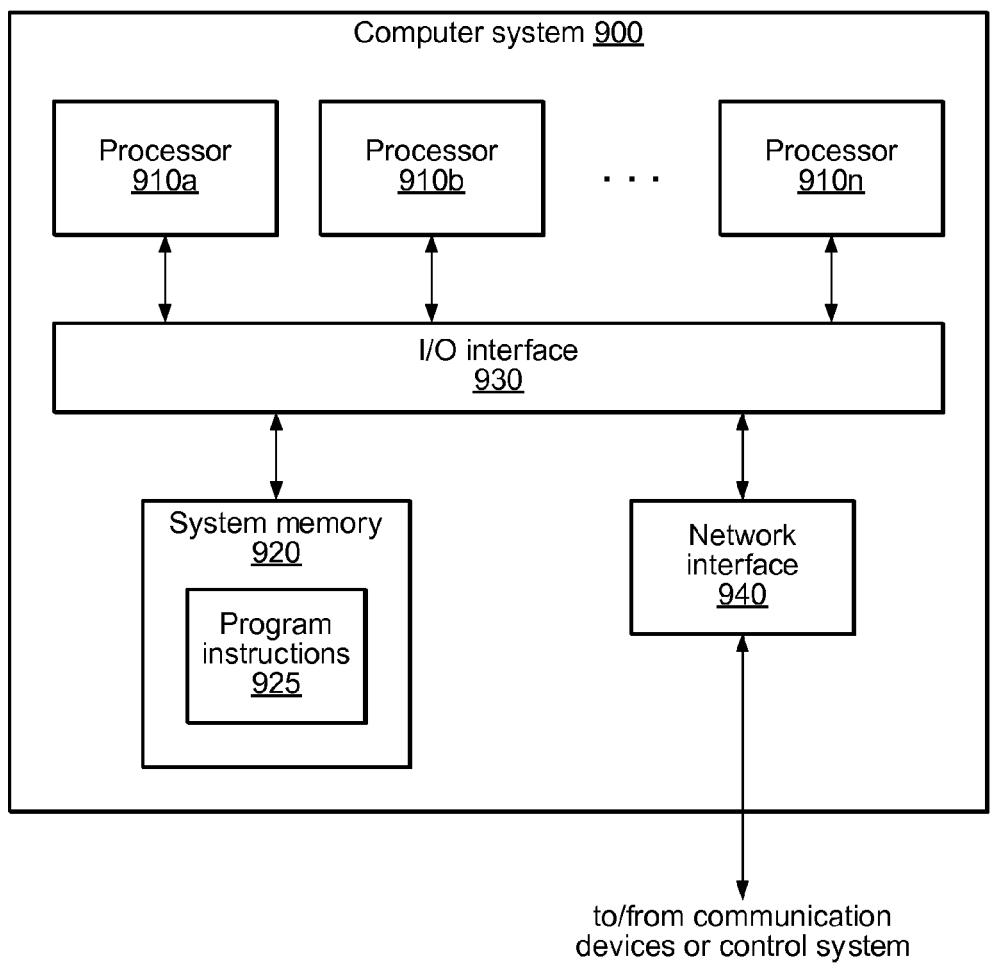
FIG. 8 is a block diagram illustrating an embodiment of a computer system, such as traffic pattern analysis system 100, usable to utilize navigational paths and/or user trails for directing advertising content to mobile device users, as described herein.

FIG. 8 is a block diagram illustrating an embodiment of a computer system, such as traffic pattern analysis system 100, usable to utilize navigational paths and/or user trails for directing advertising content to mobile device users, as described herein. In one embodiment, traffic pattern analysis system 100, illustrated in FIG. 1, may include a general-purpose computer system that includes or is configured to access one or more computer-accessible media, such as computer system 900 illustrated in FIG. 8.

In the illustrated embodiment, computer system 900 includes one or more processors 910 coupled to a system memory 920 via an input/output (I/O) interface 930. Computer system 900 further includes a network interface 940 coupled to I/O interface 930. In some embodiments, computer system 900 may be illustrative of traffic pattern analysis system 100, while in other embodiments system 100 may include elements in addition to those illustrated in computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor 910. In various embodiments, system memory 920 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for system 190, system 130 and/or system 195, are shown stored within system memory 920 as code 925.

In one embodiment, I/O interface 930 may be configured to coordinate I/O traffic between processor 910, system memory 920 and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, for example. In particular, network interface 940 may be configured to allow communication between computer system 900 and other computer system described above. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 1200 as system memory 9220 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending or storing instructions and/or data implemented in accordance with the foregoing description upon a computer-readable, storage medium. Generally speaking, a computer-readable, storage medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc.

The various methods as illustrated in the figures and described herein represent exemplary embodiments of methods. The methods may be implemented manually, in software, in hardware, or in a combination thereof. The order of any method may be changed, and various elements may be added, reordered, combined, omitted, modified, etc. Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a processor; and
   a memory coupled to the processor, wherein the memory comprises program instructions executable by the processor to:
   determine one or more locations a user of a mobile device has visited on a current path;
   predict a next destination for the user of the mobile device based on the one or more locations the user of the mobile device has visited on the current path, wherein
      to predict the next destination, the program instructions are further executable to:
      predict a plurality of likely destinations, and
      receive one or more bids for communicating advertising content regarding one or more of the likely destinations for the user of the mobile device, wherein the next destination corresponds to a likely destination for which a selected bid was received; and
   communicate advertising content to a display device other than the mobile device located along the current path between a current location for the mobile device and the next destination.

2. The system of claim 1, wherein the program instructions are further executable to communicate the advertising content to one or more additional display devices associated with the path.

3. The system of claim 1, wherein the program instructions are further executable to communicate with the mobile device to alert the user to the display device.

4. The system of claim 1, wherein the program instructions are further executable to communicate with the display device to generate a printed version of the advertising content.

5. The system of claim 1, wherein a cost of the communicating the advertising content to the mobile device user varies depending upon a probability of the mobile device user visiting the next destination.

6. The system of claim 1, wherein the cost of delivering the advertising content to the mobile device user varies depending upon how near the next destination is to the location of the mobile device user when the advertising content is displayed.

7. The system of claim 1, wherein to communicate the advertising content to the display device, the program instructions are further configured to send an audio message to the display device.

8. The system of claim 1, wherein to predict the next destination, the program instructions are further executable to analyze aggregated traffic pattern information for a plurality of other mobile device users that have visited at least one of the one or more locations visited by the user of the mobile device.

9. The system of claim 1, wherein the advertising content is presented in response to a user request for advertising content for a location proximate to the user's current location.

10. The system of claim 1, wherein to predict the next destination, the program instructions are further executable to determine a level of interest in one or more likely destinations for the user of the mobile device, wherein the next destination corresponds to a potential destination with a highest level of interest, and wherein the level of interest is based on at least a time rate of change of traffic at the potential destination.

11. The system of claim 1, wherein to predict the next destination, the program instructions are further executable to rank one or more likely destinations according to a number of other mobile device users that have traveled from at least one of the one or more locations visited by the user of the mobile device to the one or more likely destinations.

12. The system of claim 1, wherein the display device comprises one or more of: a kiosk, a billboard, an electronic ticker, or a wall-mounted display.

13. A computer-implemented method, comprising:
   determining, on one or more computer systems, one or more locations a user of a mobile device has visited on a current path;
   predicting, on one or more computer systems, a next destination for the user of the mobile device based on the one or more locations the user of the mobile device has visited on the current path, wherein the predicting the next destination comprises
      predicting a plurality of likely destinations, and
      receiving one or more bids for communicating advertising content regarding one or more of the likely destinations for the user of the mobile device, wherein the next destination corresponds to a likely destination for which a selected bid was received; and
   communicating advertising content to a display device other than the mobile device located along the current path between a current location for the mobile device and the next destination.

14. The method of claim 13, further comprising communicating the advertising content to one or more additional display devices associated with the path.

15. The method of claim 13, further comprising communicating with the mobile device to alert the user to the display device.

16. The method of claim 13, further comprising communicating with the display device to generate a printed version of the advertising content.

17. The method of claim 13, wherein communicating the advertising content to the display device comprises sending a text message to the display device.

18. The method of claim 13, wherein communicating the advertising content to the display device comprises sending a graphic image to the display device.

19. The method of claim 13, wherein communicating the advertising content to the display device comprises sending an audio message to the display device.

20. The method of claim 13, wherein predicting the next destination comprises analyzing aggregated traffic pattern information for a plurality of other mobile device users that have visited at least one of the one or more locations visited by the user of the mobile device.

21. The method of claim 13, wherein predicting the next destination comprises receiving one or more bids for communicating advertising content regarding each of one or more likely destinations for the user of the mobile device, wherein the next destination corresponds to a potential destination for which a highest bid was received.

22. The method of claim 13, wherein predicting the next destination comprises determining a level of interest in one or more likely destinations for the user of the mobile device, wherein the next destination corresponds to a potential destination with a highest level of interest, and wherein the level of interest is based on at least a time rate of change of traffic at the potential destination.

23. The method of claim 13, further comprising receiving positional information corresponding to a current location for the user of the mobile device and wherein predicting the next destination is determined based in part on the current location.

24. The method of claim 13, wherein predicting the next destination comprises ranking one or more likely destinations according to a number of other mobile device users that have traveled from at least one of the one or more locations visited by the user of the mobile device to the one or more likely destinations.

25. A non-transitory computer readable storage medium, comprising program instruction executable to implement:
   determining one or more locations a user of a mobile device has visited on a current path;
   predicting a next destination for the user of the mobile device based on the one or more locations the user of the mobile device has visited on the current path, wherein the predicting the next destination comprises
       predicting a plurality of likely destinations, and
       receiving one or more bids for communicating advertising content regarding one or more of the likely destinations for the user of the mobile device, wherein the next destination corresponds to a likely destination for which a selected bid was received; and
   communicating advertising content to a display device located along the current path between a current location for the mobile device and the next destination.

26. The medium of claim 25, wherein the program instructions are further executable to implement communicating the advertising content to one or more additional display devices associated with the path.

27. The medium of claim 25, wherein the program instructions are further executable to implement communicating with the mobile device to cause the mobile device to alert the user to the display device.

28. The medium of claim 25, wherein the program instructions are further executable to implement communicating with the display device to generate a printed version of the advertising content.

29. The medium of claim 25, wherein communicating the advertising content to the display device comprises sending a text message to the display device.

30. The medium of claim 25, wherein communicating the advertising content to the display device comprises sending a graphic image to the display device.

31. The medium of claim 25, wherein communicating the advertising content to the display device comprises sending an audio message to the display device.

32. The medium of claim 25, wherein predicting the next destination comprises analyzing aggregated traffic pattern information for a plurality of other mobile device users that have visited at least one of the one or more locations visited by the user of the mobile device.

33. The medium of claim 25, wherein predicting the next destination comprises receiving one or more bids for communicating advertising content regarding each of one or more likely destinations for the user of the mobile device, wherein the next destination corresponds to a potential destination for which a highest bid was received.

34. The medium of claim 25, wherein predicting the next destination comprises determining a level of interest in one or more likely destinations for the user of the mobile device, wherein the next destination corresponds to a potential destination with a highest level of interest, and wherein the level of interest is based on at least a time rate of change of traffic at the potential destination.

35. The medium of claim 25, wherein the program instructions are further executable to implement receiving positional information corresponding to a current location for the user of the mobile device and wherein predicting the next destination is determined based in part on the current location.

36. The medium of claim 25, wherein predicting the next destination comprises ranking one or more likely destinations according to a number of other mobile device users that have traveled from at least one of the one or more locations visited by the user of the mobile device to the one or more likely destinations.

* * * * *